United States Patent
Hamza

(10) Patent No.: US 12,348,772 B2
(45) Date of Patent: Jul. 1, 2025

(54) PARTIAL ACCESS SUPPORT IN ISOBMFF CONTAINERS FOR VIDEO-BASED POINT CLOUD STREAMS

(71) Applicant: InterDigital Patent Holdings, Inc., Wilmington, DE (US)

(72) Inventor: Ahmed Hamza, Coquitlam (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 17/919,095

(22) PCT Filed: Apr. 14, 2021

(86) PCT No.: PCT/US2021/027206
§ 371 (c)(1),
(2) Date: Oct. 14, 2022

(87) PCT Pub. No.: WO2021/211665
PCT Pub. Date: Oct. 21, 2021

(65) Prior Publication Data
US 2023/0188751 A1 Jun. 15, 2023

Related U.S. Application Data

(60) Provisional application No. 63/087,425, filed on Oct. 5, 2020, provisional application No. 63/062,983, filed
(Continued)

(51) Int. Cl.
*H04N 19/597* (2014.01)
*H04N 19/119* (2014.01)
(Continued)

(52) U.S. Cl.
CPC ......... *H04N 19/597* (2014.11); *H04N 19/119* (2014.11); *H04N 19/176* (2014.11); *H04N 19/46* (2014.11)

(58) Field of Classification Search
CPC .................................................. H04N 19/597
See application file for complete search history.

(56) References Cited

U.S. PATENT DOCUMENTS

2020/0105063 A1   4/2020  Wang et al.
2022/0353539 A1*  11/2022 Huang .................. H04N 19/70

FOREIGN PATENT DOCUMENTS

EP        3349182 A1      7/2018
WO    2019/191205 A1     10/2019
(Continued)

OTHER PUBLICATIONS

Aksu, Emre B., "Technologies Under Consideration for Carriage of Point Cloud Data", Systems, ISO/IEC JTC1/SC29/WG11 MPEG2018/N18414, Geneva, CH, Mar. 2019, 38 pages.
(Continued)

*Primary Examiner* — Jerry T Jean Baptiste
(74) *Attorney, Agent, or Firm* — Condo Roccia Koptiw LLP

(57) ABSTRACT

Systems, devices, and methods are described herein for partial access support in SOBMFF containers for video-based point cloud streams. A video encoding device may partition a 3D space into a first spatial region and a second spatial region. The video encoding device may map the first spatial region to a first set of V-PCC tiles and the second spatial region to a second set of V-PCC tiles. The video encoding device may determine a first track to carry first mapping information associated with the first spatial region that is mapped to the first set of V-PCC tiles. The video encoding device may determine a second track to carry second mapping information associated with the second spatial region that is mapped to the second set of V-PCC
(Continued)

files. The video encoding device may send In a timed-metadata V-PCC bitstream the first track and the second track,

19 Claims, 14 Drawing Sheets

Related U.S. Application Data on Aug. 7, 2020, provisional application No. 63/042,892, filed on Jun. 23, 2020, provisional application No. 63/009,931, filed on Apr. 14, 2020.

(51) Int. Cl.
*H04N 19/176* (2014.01)
*H04N 19/46* (2014.01)

(56) References Cited

FOREIGN PATENT DOCUMENTS

| | | |
|---|---|---|
| WO | 2020/070379 A1 | 4/2020 |
| WO | 2020/072579 A1 | 4/2020 |

OTHER PUBLICATIONS

Hamza et al., "Supporting V-PCC Tile Groups and Spatial Access in MPEG-I Part 10", InterDigital Communications, Inc., ISO/IEC JTC1/SC29/WG11 m49107, Gothenburg, SE, Jul. 2019, 5 pages.

Wang et al., "On Track Derivation Approach to Storage of Tiled V-PCC Content in ISOBMFF", MediaTek USA, Inc., ISO/IEC JTC1/SC29/WG11 MPEG2019/m47355, Geneva, CH, Mar. 2019, 10 pages.

ISO/IEC, "Proposed Updates to Annex G of ISO/IEC 23090-10 to Support Viewport Signaling ", ISO/IEC JTC1/SC29/WG11 MPEG2020/ M54747, Online Meeting, Jul. 2020, 7 pages.

ISO, " Information technology—Coded representation of immersive media—Part 10: Carriage of Visual Volumetric Video-based Coding Data", ISO/IEC JTC1/SC 29/WG 11, ISO 23090-10:2020(E), 2020, 58 pages.

ISO/IEC, " Draft Text of ISO/IEC DIS 23090-10 Carriage of Video-based Point Cloud Compression Data ", ISO/IEC JTC 1/SC 29/WG 11 N19066, Feb. 21, 2020, 46 pages.

ISO/IEC, "Information technology—Coded Representation of Immersive Media—Part 5: Video-based Point Cloud Compression", ISO/IEC 23090-5:2019(E); ISO/IEC JTC 1/SC 29/WG 11, N18888, MPEG 128; https://www.mpeg.org/meetings/mpeg-128/, 2019, 210 pages.

ISO/IEC, "Report on Scalability features in V-PCC", ISO/IEC JTC 1/SC 29/WG 11 N19156; Brussels; MPEG 129; https://www.mpeg.org/meetings/mpeg-129/, Jan. 2020, 15 pages.

ISO/IEC, "Technologies under consideration on carriage of PC data", n18414, 126, MPEG Meeting, Mar. 25, 2019-Mar. 29, 2019, Geneva, (Motion Picture Expert Group or ISO/IEC JTC1/SC29/WG11), May 7, 2019, 38 pages.

ISO/IEC, "Use Cases for Point Cloud Compression (PCC)", ISO/IEC JTC1/SC29/WG11 MPEG2015/ N16331, Geneva, CH, Jun. 2016, 8 pages.

ISO/IEC, "Information Technology—Coding of Audio-Visual Objects—Part 12: ISO Base Media File Format", ISO/IEC 14496-12:2015(E), Dec. 15, 2015, 248 pages.

ISO/IEC, "Text of ISO/IEC DIS 23090-5 Video-Based Point Cloud Compression", ISO/IEC JTC 1/SC 29/WG 11 N18670, Coding of Moving Pictures and Audio, Oct. 10, 2019, 185 pages.

ISO/IEC, "WD 4 of ISO/IEC 23090-2 OMAF 2nd Edition", Systems, ISO/IEC JTC1/SC29/WG11 N18227-V1, Marrakech, MA, Jan. 2019, 227 pages.

ISO/IEC, "ISO/IEC FDIS 23090-5, Information technology—Coded Representation of Immersive Media—Part 5: Visual Volumetric Video-based Coding (V3C) and Video-based Point Cloud Compression (V-PCC)", ISO/IEC JTC 1/SC 29/WG 11 N19579, Coding of Moving Pictures and Audio, Sep. 21, 2020, 352 pages.

ISO/IEC, "[V-PCC] Object Annotation of Patches and Volumetric Rectangles in V-PCC", ISO/IEC JTC1/SC29/WG11 MPEG2019/m52705, Coding of Moving Pictures and Audio, Jan. 2020, 14 pages.

\* cited by examiner

PARTIAL ACCESS SUPPORT IN ISOBMFF CONTAINERS FOR VIDEO-BASED POINT CLOUD STREAMS

CROSS-REFERENCE TO RELATED APPLICATIONS

This application is the National Stage Entry under 35 U.S.C. § 371 of Patent Cooperation Treaty Application No. PCT/US2021/027206, filed Apr. 14, 2021, which claims the benefit of Provisional U.S. Patent Application No. 63/009,931, filed Apr. 14, 2020, Provisional U.S. Patent Application No. 63/042,892, filed Jun. 23, 2020, Provisional U.S. Patent Application No. 63/062,983, filed Aug. 7, 2020, and Provisional U.S. Patent Application No. 63/087,425, filed Oct. 5, 2020, the disclosure of which is incorporated herein by reference in its entirety.

BACKGROUND

A point cloud may comprise a set of points represented in 3D space using coordinates indicating the location and attributes of each point. Reconstructing objects and scenes based on point clouds may require processing millions of points. Efficient compression may be essential for storing and transmitting point cloud data.

Video-based point cloud compression (V-PCC) bitstreams may comprise a sequence of V-PCC units. Each V-PCC unit may include a V-PCC header and a V-PCC payload. The V-PCC header may describe the V-PCC unit type while the V-PCC payload may provide the data associated with the V-PCC unit type. The sequence of V-PCC units may be signaled in the V-PCC bitstream to a video decoder. Current V-PCC signaling may not be adequate for certain types of access (e.g., partial access) of a V-PCC sequence.

SUMMARY

Systems, devices, and methods are described herein for partial access support in International Organization for Standardization Base Media File Format (ISOBMFF) containers for video-based point cloud streams. File format structures may enable flexible, partial access to different parts of a coded point cloud sequence (e.g., encapsulated in an ISOBMFF container).

A video encoding device may partition a 3D space into a first spatial region and a second spatial region. The video encoding device may map the first spatial region to a first set of video-based point cloud compression (V-PCC) tiles and the second spatial region to a second set of V-PCC tiles. Each of the first set of V-PCC tiles and the second set of V-PCC tiles may be associated with an atlas frame. Each of the first set of V-PCC tiles and the second set of V-PCC tiles may be independently decodable. Mapping each of the first spatial region to the first set of V-PCC tiles and the second spatial region to the second set of V-PCC tiles may be based on tile identifications and/or track identifications. The first set of V-PCC tiles may be associated with a first set of patches and the second set of V-PCC tiles may be associated with a second set of patches. The video encoding device may determine a first track to carry first mapping information associated with the first spatial region that is mapped to the first set of V-PCC tiles. The video encoding device may determine a second track to carry second mapping information associated with the second spatial region that is mapped to the second set of V-PCC tiles. The video encoding device may send in a timed-metadata V-PCC bitstream the first track and the second track. The first track and the second track may be sent in a media container file.

The video encoding device may determine an update dimensions flag. The update dimensions flag may indicate an update to one or more dimensions of the first spatial region or an update to one or more dimensions of the second spatial region. The video encoding device may send the update dimensions flag in the time-metadata V-PCC bitstream.

The first spatial region may be associated with a first object. The second spatial region may be associated with a second object. The video encoding device may determine one or more object flags. The video encoding device may send the object flag(s) in the timed-metadata V-PCC bitstream. The video encoding device may determine an object dependency flag indicating the first object associated with the first spatial region is dependent on the second object associated with the second spatial region and may send the object dependency flag in the timed-metadata V-PCC bitstream. The video encoding device may determine an update object flag indicating an update to the first object associated with the first spatial region or an update to the second object associated the second spatial region and may send the update object flag in the timed-metadata V-PCC bitstream.

DETAILED DESCRIPTION

A detailed description of illustrative embodiments will now be described with reference to the various Figures.

Although this description provides a detailed example of possible implementations, it should be noted that the details are intended to be exemplary and in no way limit the scope of the application.

Figure 1A:
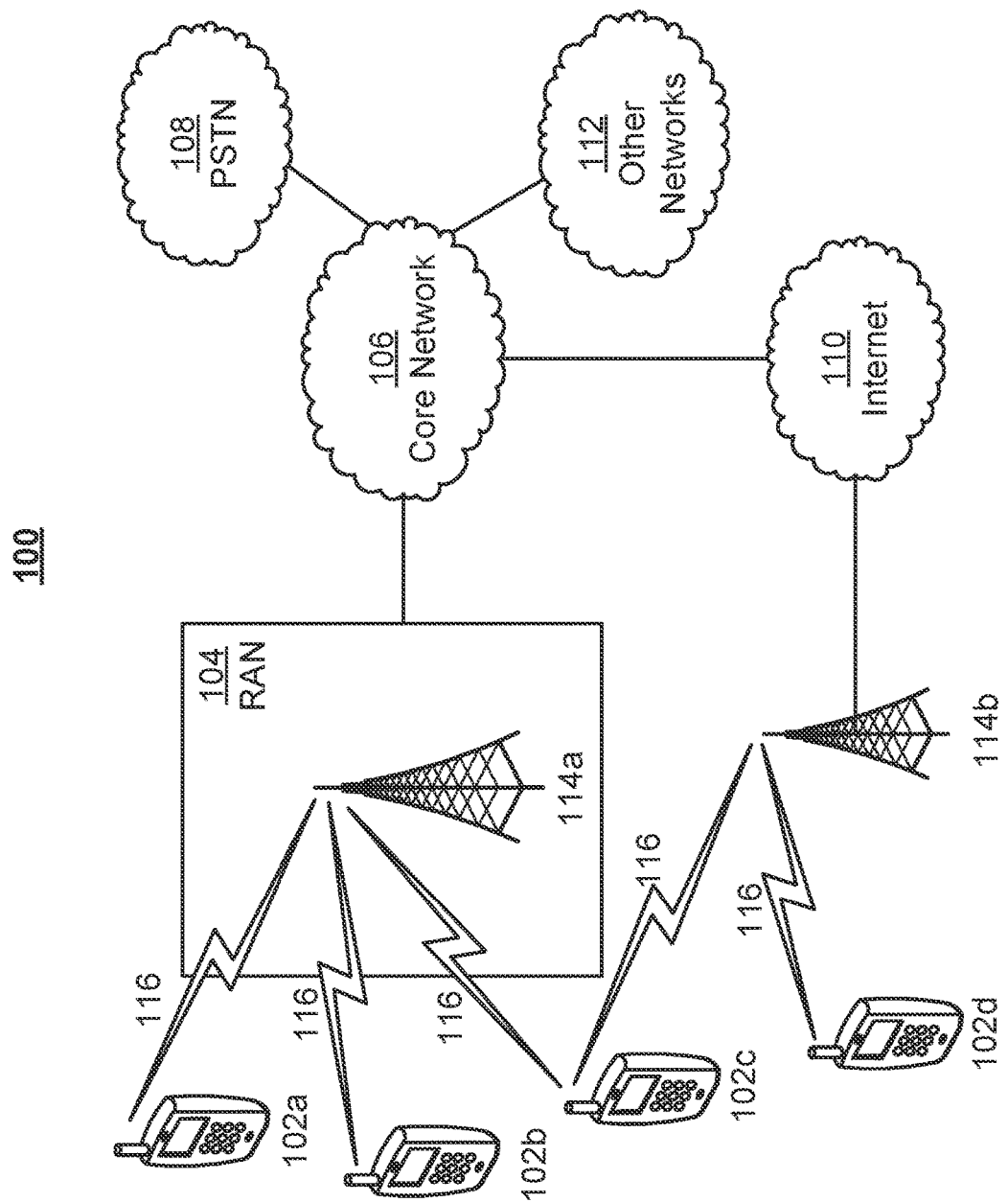
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SG-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the aft interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LIE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the Internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
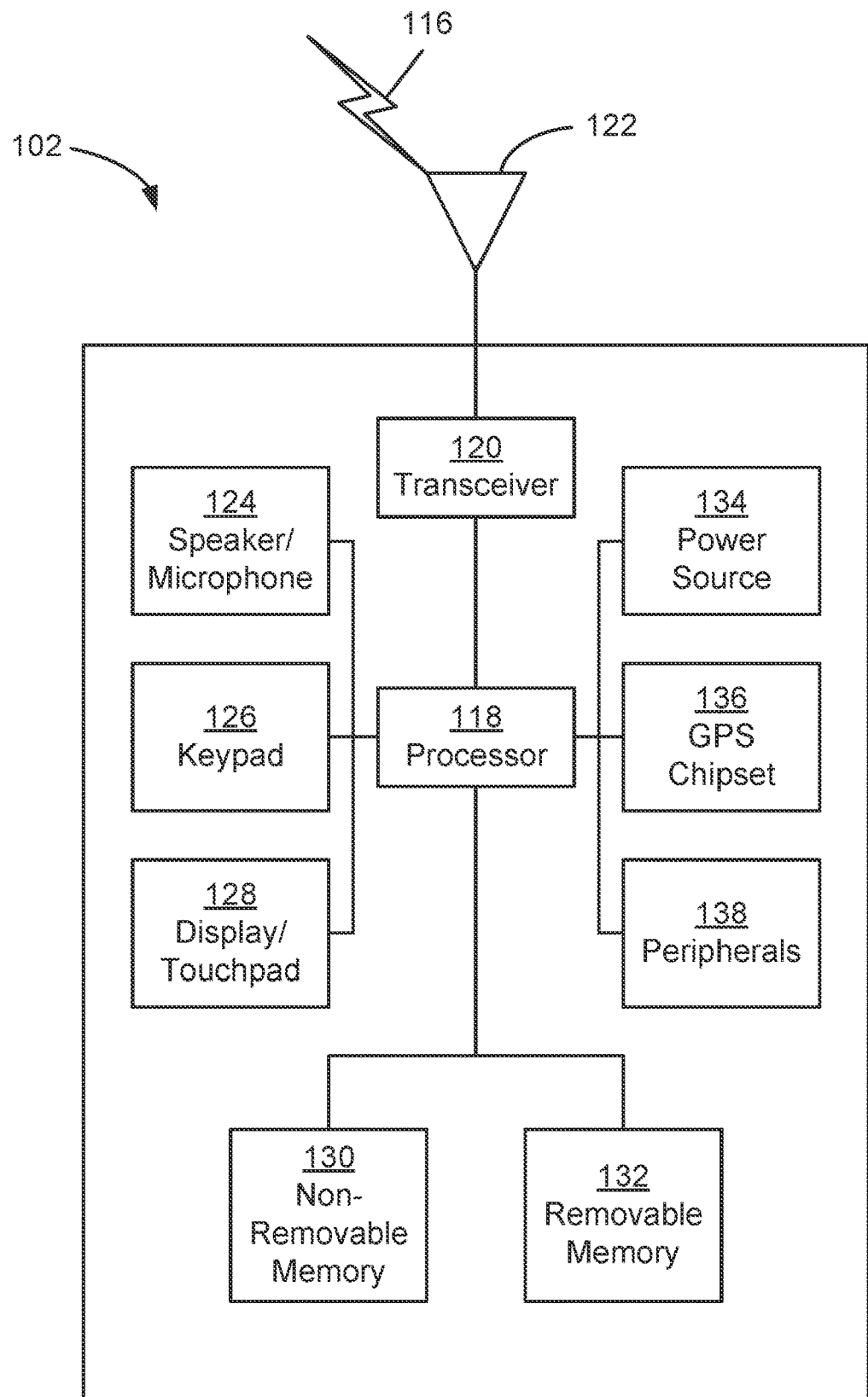
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
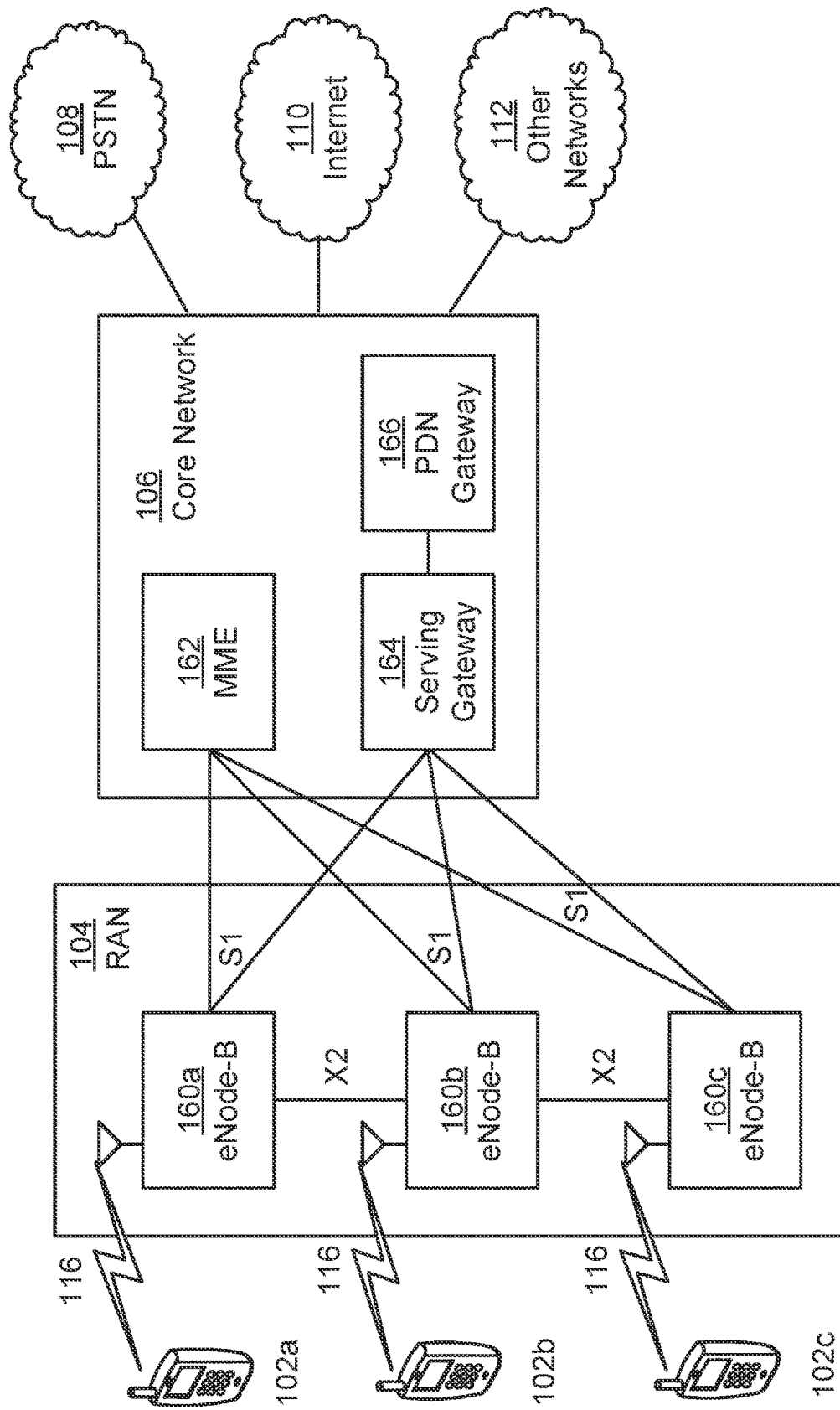
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
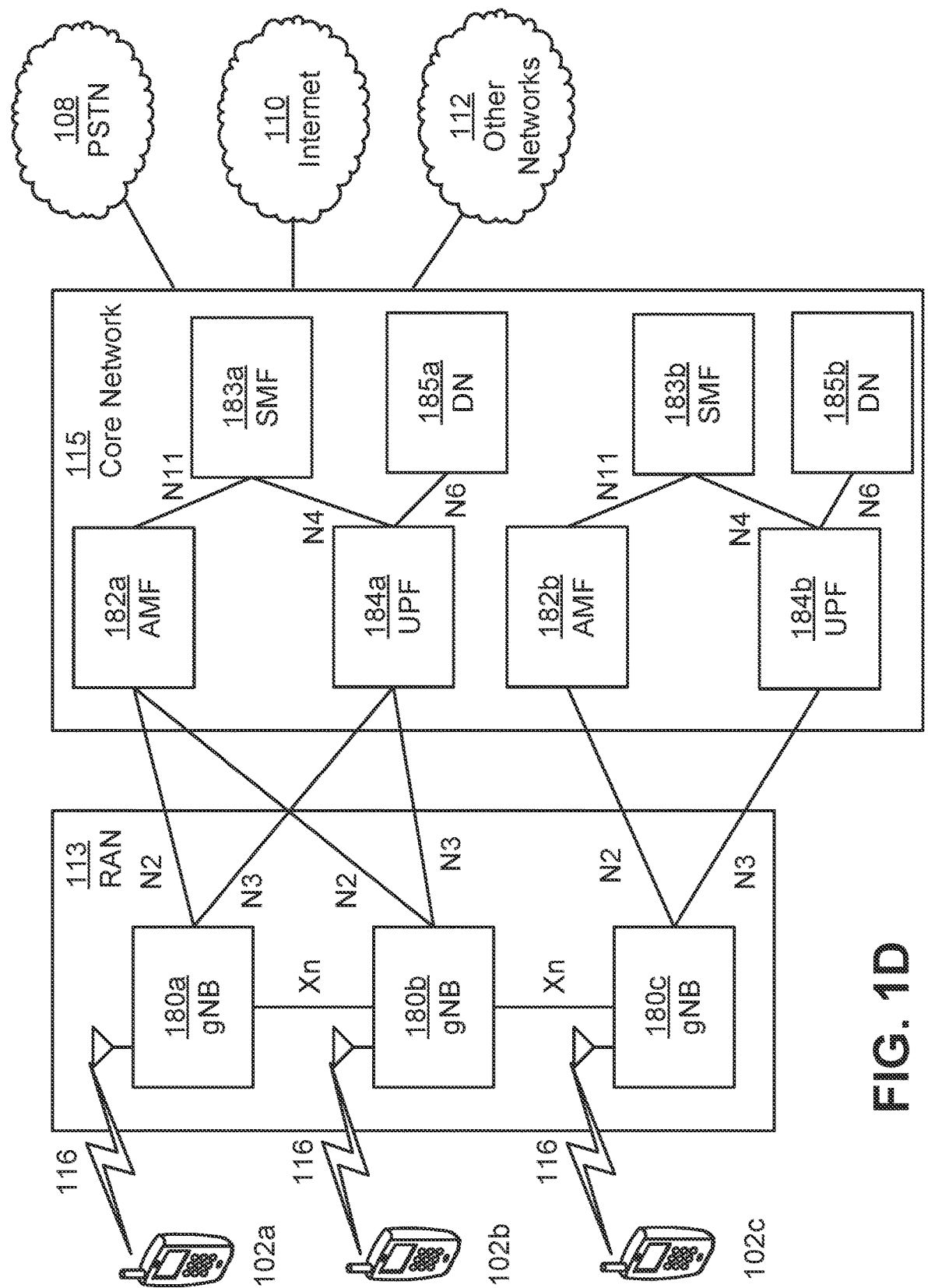
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM, subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-aft wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples or embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 1-10 described herein may provide some embodiments, but other embodiments are contemplated. The discussion of FIGS. 1-10 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
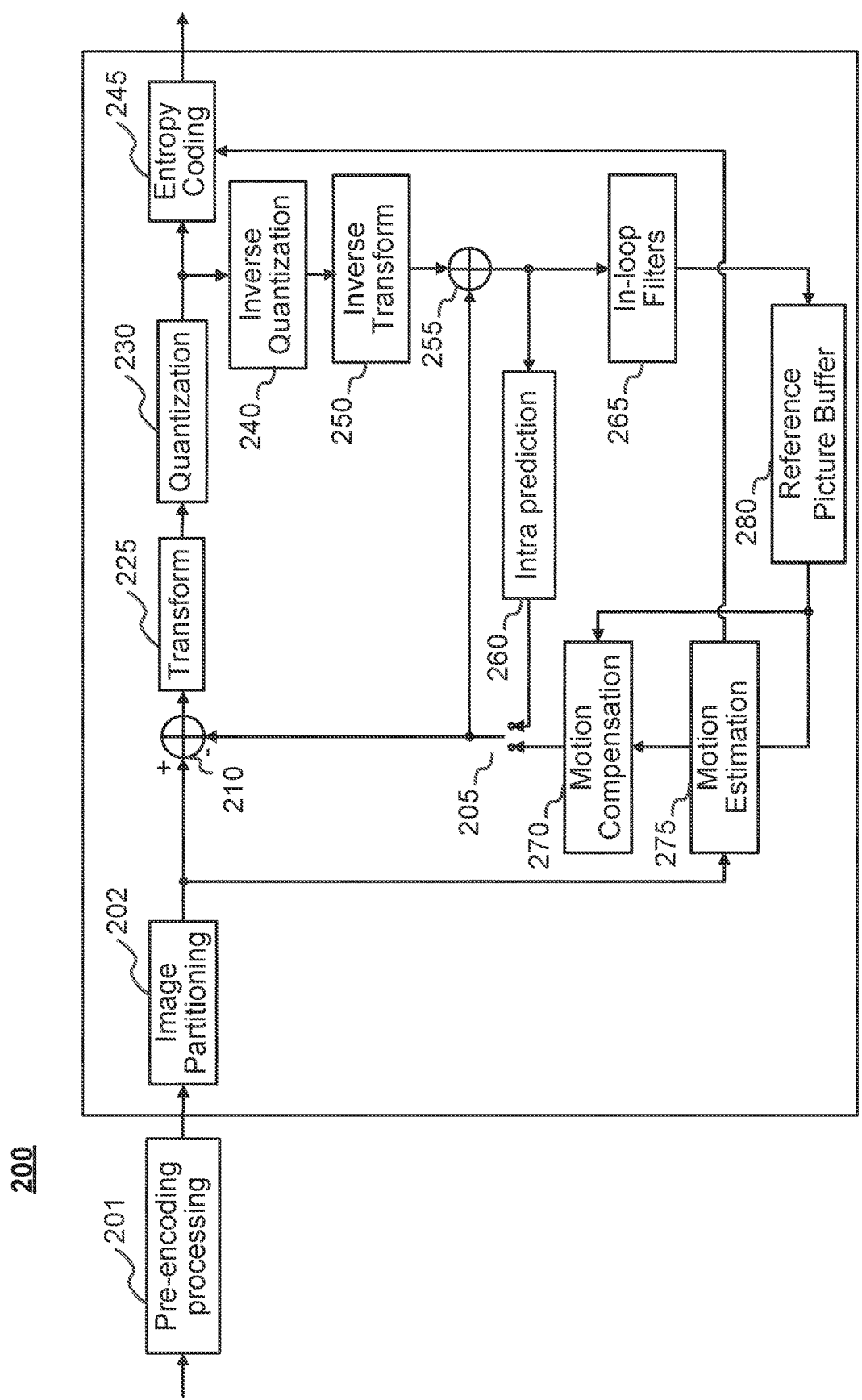
FIG. 2 is a diagram showing an example of a block-based video encoder.
Figure 3:
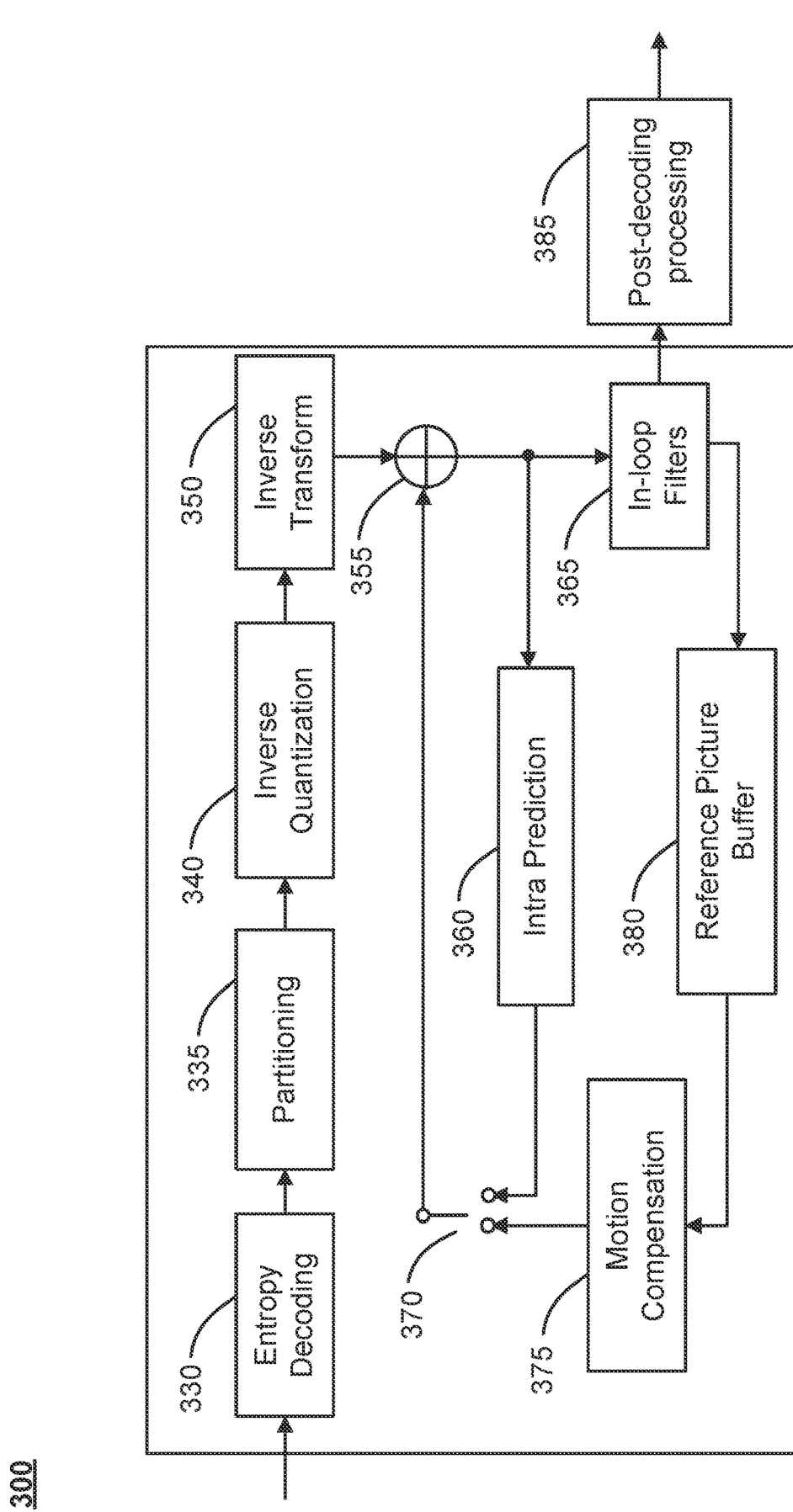
FIG. 3 is a diagram showing an example of a video decoder.

Various methods and other aspects described in this application may be used to modify modules, for example, of a video encoder 200 and decoder 300 as shown in FIG. 2 and FIG. 3. Moreover, the subject matter disclosed herein presents aspects that are not limited to VVC or HEVC, and may be applied, for example, to any type, format or version of video coding, whether described in a standard or a recommendation, whether pre-existing or future-developed, and extensions of any such standards and recommendations (e.g., including VVC and HEVC). Unless indicated otherwise, or technically precluded, the aspects described in this application may be used individually or in combination.

Various numeric values are used in examples described the present application, such as a count of the remaining bytes as 013, a nal_unit_type value in the ranges 0-5 and 10-21, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the infra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
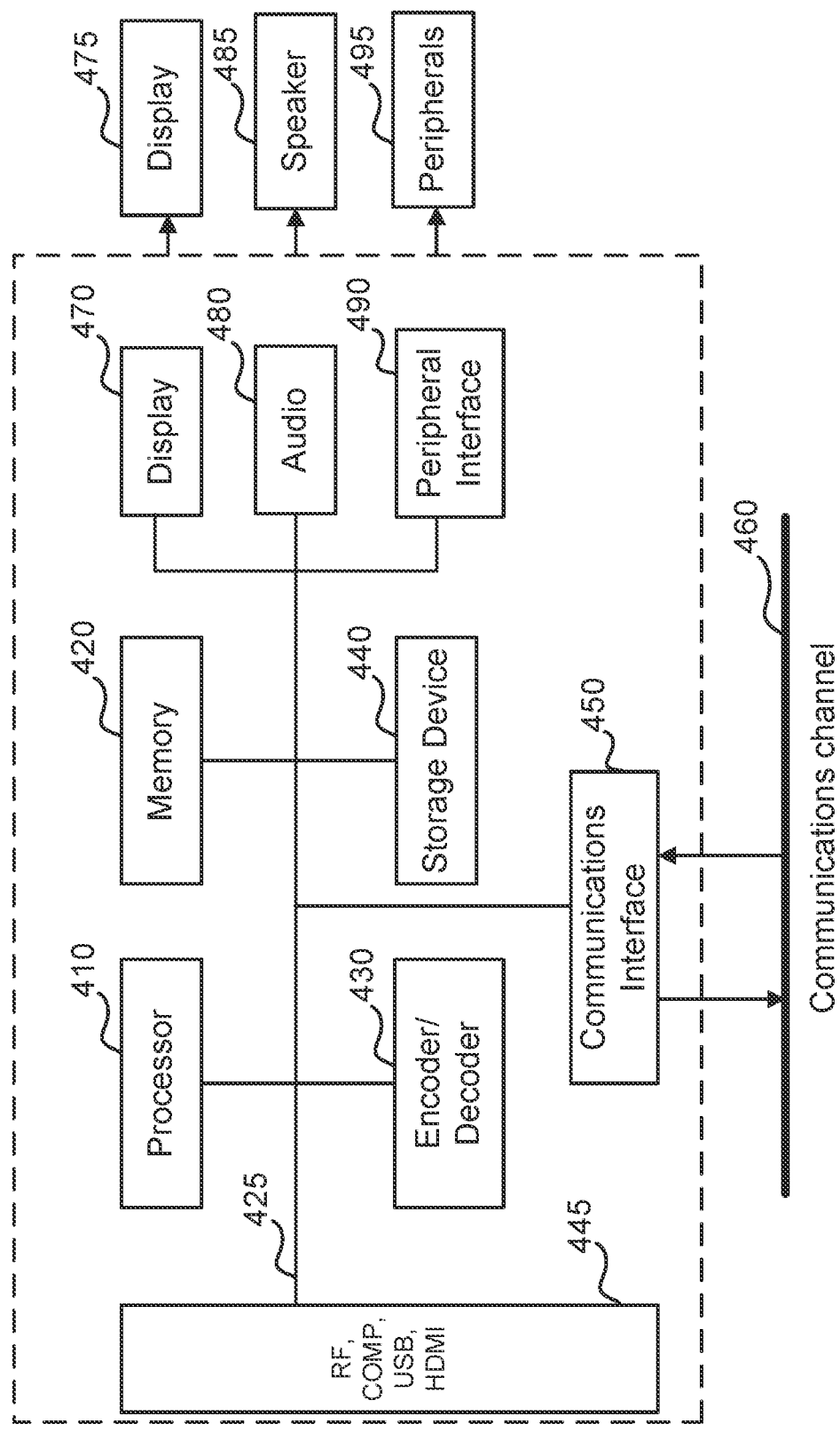
FIG. 4 is a diagram showing an example of a system in which various aspects and examples may be implemented.

FIG. 4 is a diagram showing an example of a system in which various aspects and embodiments described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various embodiments, the system 400 is communicatively coupled to one or more other systems, or other electronic devices, via, for example, a communications bus or through dedicated input and/or output ports. In various embodiments, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various embodiments, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 410 and/or the encoder/decoder module 430 is used to store instructions and to provide working memory for processing that is needed during encoding or decoding. In other embodiments, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as, for example, MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various embodiments, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various embodiments, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these embodiments is typically connected to an access point or router that provides access to external networks including the Internet for allowing streaming applications and other over-the-top communications. Other embodiments provide streamed data to the system 400 using a set-top box that delivers the data over the HDMI connection of the input block 445. Still other embodiments provide streamed data to the system 400 using the RF connection of the input block 445. As indicated above, various embodiments provide data in a non-streaming manner. Additionally, various embodiments use wireless networks other than Wi-Fi, for example a cellular network or a Bluetooth network.

The system 400 can provide an output signal to various output devices, including a display 475, speakers 485, and other peripheral devices 495. The display 475 of various embodiments includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples of embodiments, one or more of a stand-alone digital video disc (or digital versatile disc) (DVR, for both terms), a disk player, a stereo system, and/or a lighting system. Various embodiments use one or more peripheral devices 495 that provide a function based on the output of the system 400. For example, a disk player performs the function of playing the output of the system 400.

In various embodiments, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various embodiments, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various embodiments in which the display 475 and speakers 485 are external components, the output signal may be provided via dedicated output connections, including, for example, HDMI ports, USB ports, or COMP outputs.

The embodiments may be carried out by computer software implemented by the processor 410 or by hardware, or by a combination of hardware and software. As a non-limiting example, the embodiments may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decoding a portion of a coded point cloud sequence (e.g., encapsulated in an ISOBMFF container using one or more file format structures, for example, as disclosed herein) to provide partial access to the coded point cloud sequence (e.g., encapsulated in the ISOBMFF container), etc.

As further embodiments, in one example "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be dear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, encoding a video-based point cloud bitstream comprising one or more file format structures (e.g., as disclosed herein) to provide partial access support to different parts of a coded point cloud sequence (e.g., encapsulated in the ISOBMFF container), etc.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, atlas_tile_group_layer_rbsp( ), VPCCTileGroupSampleEntry, VolumetricSampleEntry, TrackGroupTypeBox, SpatialRegionGroupBox, TrackGroupTypeBox, DynamicVolumetricMetadataSampleEntry, 3DSpatialRegionStruct, VPCCVolumetricMetadataSample, VPCCAtlasSampleEntry, etc, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment," "an embodiment," "an example," "one implementation" or "an implementation," as well as other variations thereof, means that a particular feature, structure, characteristic, and so forth described in connection with the embodiment is included in at least one embodiment. Thus, the appearances of the phrase "in one embodiment," "in an embodiment," "in an example," "in one implementation," or "in an implementation", as well any other variations, appearing in various places throughout this application are not necessarily all referring to the same embodiment or example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "i", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

Also, as used herein, the word "signal" refers to, among other things, indicating something to a corresponding decoder. In some embodiments, the encoder may signal (e.g., in an encoded bitstream and/or in an encapsulating file, such as an ISOBMFF container), for example, a V-PCC parameter set, SEI messages, metadata, an edit list, post decoder requirements, signals that enable flexible partial access to different parts of the coded point cloud sequence encapsulated in an ISOBMFF container, a dependency list for each signaled object, a mapping to a spatial region, 3D bounding box information, etc. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Capturing and rendering three-dimensional (3D) images (e.g., using 3D point clouds) may have many applications (e.g., tele-presence, virtual reality, and large-scale dynamic 3D maps). 3D point clouds may be used to represent immersive media A 3D point cloud may include a set of points represented in 3D space. A (e.g., each) point may include coordinates and/or one or more attributes. Coordinates may indicate the location of a (e.g., each) point. Attributes may include, for example, one or more of the following: a color associated with each point, transparency, time of acquisition, reflectance of laser or material property, etc. Point clouds may be captured or deployed in a number of ways. A point cloud may be captured or deployed, for example, using multiple cameras and depth sensors, Light Detection and Ranging (LiDAR) laser scanners, and so on (e.g., to sample 3D space). A point (e.g., represented by coordinates and/or attributes) may be generated, for example, by sampling of an object in 3D space. Point clouds may comprise a plurality of points, each of which may be represented by a set of coordinates (e.g., x, y, z coordinates) that map to 3D space. In an example, a 3D object or scene may be represented or reconstructed with a point cloud comprising millions or billions of sampled points. 3D point clouds may represent static and/or dynamic (moving) 3D scenes.

Point cloud data may be represented and/or compressed (e.g., point cloud compression (PCC)), for example, to (e.g., efficiently) store and/or transmit point cloud data. Geometry-based compression may be utilized to encode and decode static point clouds and video-based compression may be utilized to encode and decode dynamic point clouds, for example, to support efficient and interoperable storage and transmission of 3D point clouds. Point cloud sampling, representation, compression, and/or rendering may support lossy and/or lossless coding (e.g., encoding or decoding) of a point cloud's geometric coordinates and/or attributes.

Figure 5:
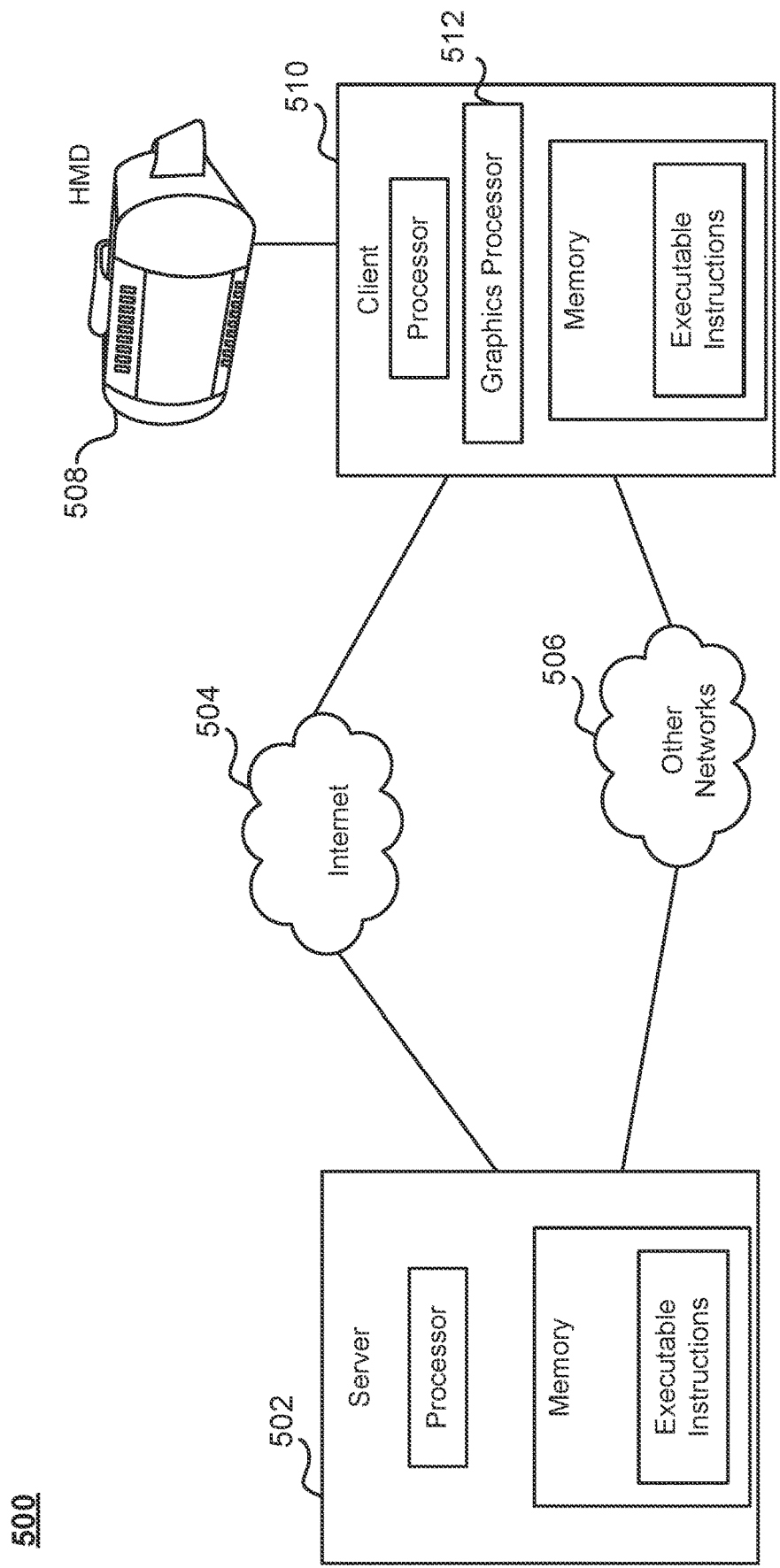
FIG. 5 is a diagram showing an example interface between a server and a client.

FIG. 5 is a diagram showing a system interface 500 for a server 502 and a client 510. The server 502 may be a point cloud server connected to the internet 504 and other networks 506. A client 510 is also connected to the internet 504 and other networks 506, enabling communication between the nodes (e.g., server 502 and client 510). Each node comprises a processor, a non-transitory computer readable memory storage medium, and executable instructions contained within the storage medium that are executable by the processor to carry out methods or portions of methods disclosed herein. One or more nodes may further include one or more sensors. The client 510 may (e.g., may also) include a graphics processor 512 for rendering 3D video for a display, such as a head-mounted display (HMD) 508. Any or all of the nodes may comprise a WTRU and communicate over the networks, as described above with respect to FIGS. 1A-1D.

Figure 6:
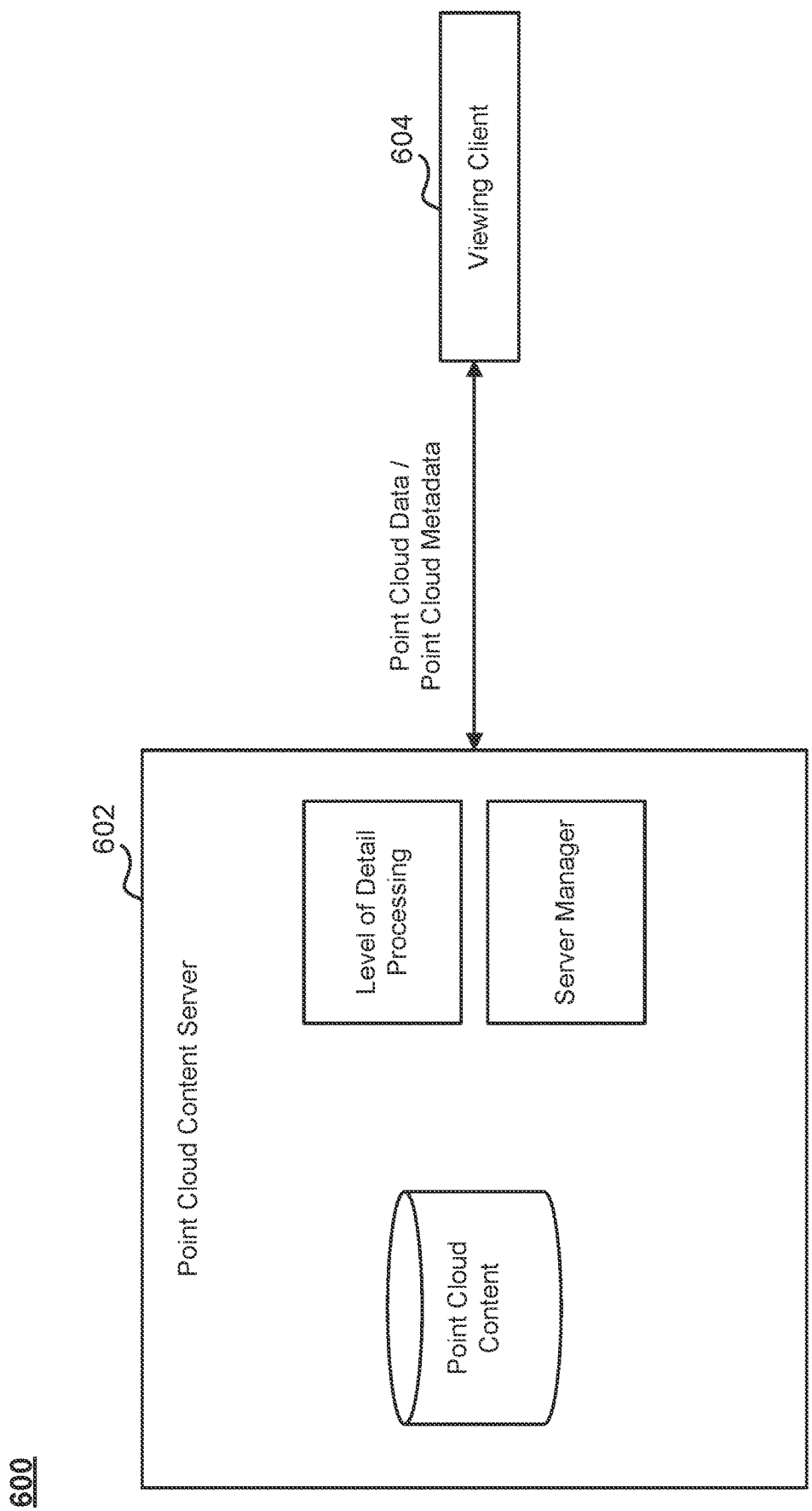
FIG. 6 is a diagram showing an example interface between a server and a client.

FIG. 6 is a diagram showing a system interface 600 for a server 602 and a client 604. The server 602 may be a point cloud content server 602 and may include a database of point cloud content, logic for processing the level of detail, and a server management function. In some examples, the processing for detail may reduce the resolution for transmission to a client 604 (e.g., viewing client 604), such as due to bandwidth limitations or as permitted because the viewing distance is sufficient to permit a reduction. The point cloud content server 602 may be in communication with the client 604, and point cloud data and/or point cloud metadata may be exchanged. For some examples, point cloud data rendered for a viewer may undergo a process of data construction to reduce and/or increase the level of detail, such as from point cloud data and/or point cloud metadata (e.g., streamed from the point cloud server 602 to the viewing client 604). The point cloud server 602 may stream the point cloud data in the resolution that the spatial capturing has provided, or, for some embodiments, down-sampled in order to comply with, e.g., bandwidth constraints or viewing distance tolerances. The point cloud server 602 may dynamically reduce the level of detail. In some examples, the point cloud server 602 may (e.g., may also) segment the point cloud data and identify objects within the point cloud. In some examples, points within point cloud data corresponding to a selected object may be replaced with lower resolution data.

A client 604 (e.g., a client 604 with an HMD) may request portions and/or tiles of a point cloud from the point cloud content server 602 via a bit stream, for example, a video-based point cloud compression (V-PCC) coded bitstream. For example, portions and/or tiles of a point cloud may be retrieved based on a location and/or an orientation of the HMD.

Figure 7:
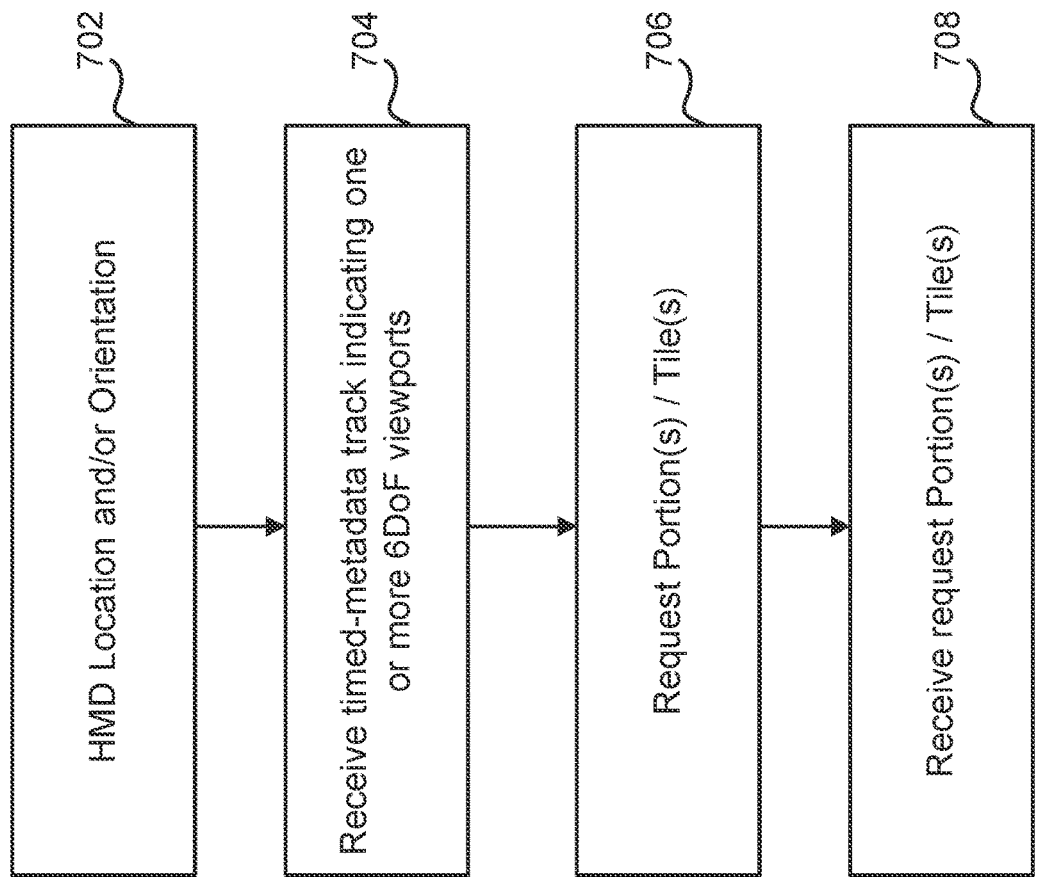
FIG. 7 is a diagram showing an example of requesting content by a client (e.g., a head-mounted display (HMD)).

FIG. 7 is a diagram showing an example 700 of requesting content by a client (e.g., an HMD). It is understood that HMD and client are used interchangeably, such that one or more steps described as being performed by an HMD may be performed by the client (e.g., on behalf of the HMD). At 702, a location of the HMD may be determined. At 702, an orientation of the HMD may be determined. A viewport from the received viewports may be selected. At 704, a timed-metadata track indicating one or more 6DoF viewports may be received by the HMD and/or the client from a point cloud server. At 706, one or more tile group tracks may be requested from the point cloud server of FIG. 5 or FIG. 6. At 708, the requested tile group tracks may be received (e.g., at the HMD). The received set of tile group tracks may carry information for rendering spatial regions or objects within a point cloud scene, for example, as described herein. Systems based on FIG. 1A through FIG. 6 may be implemented based upon the disclosure herein.

Figure 8:
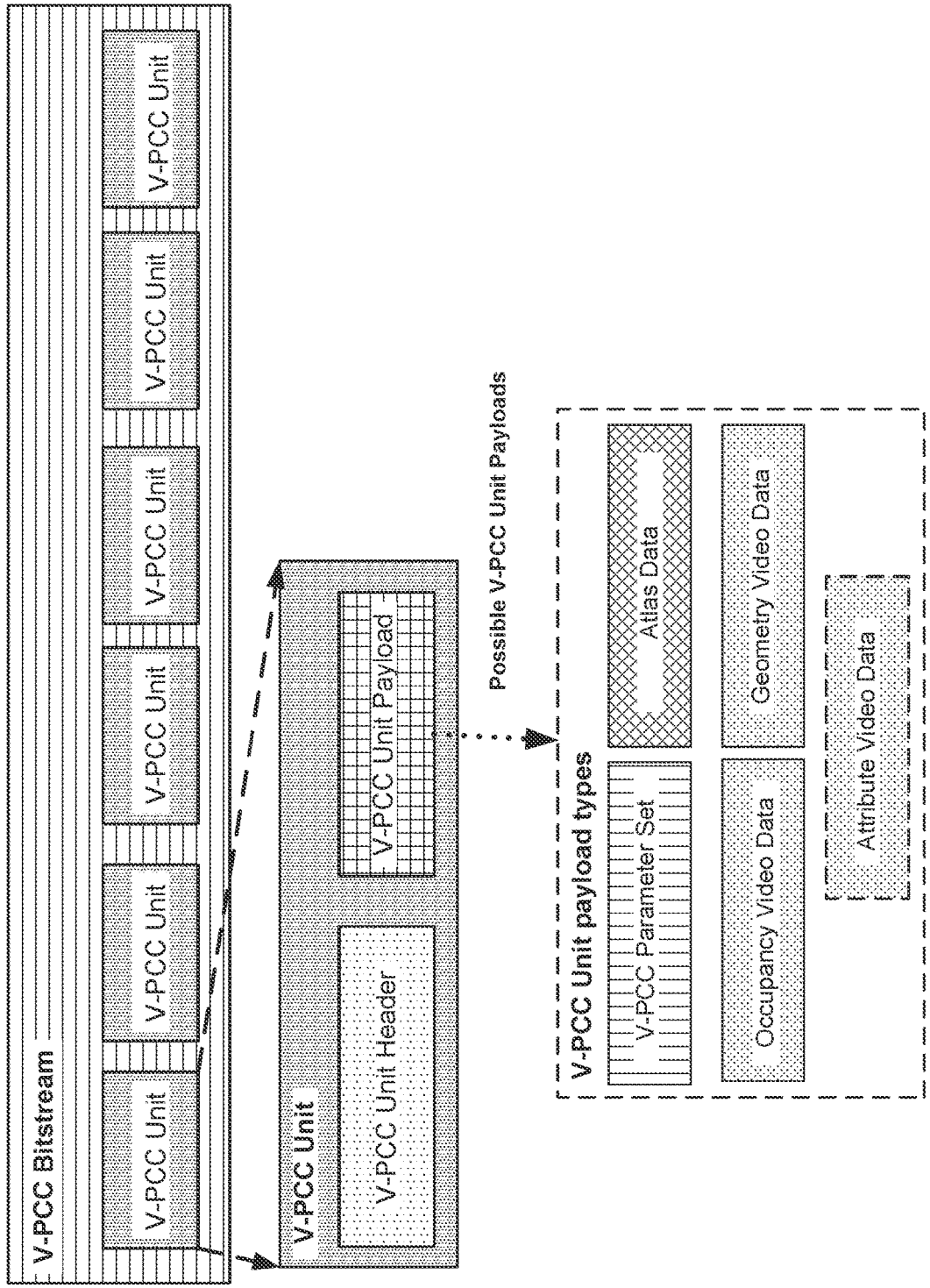
FIG. 8 is a diagram showing an example of a video-based point cloud compression (V-PCC) bitstream structure as a sequence of V-PCC units.

FIG. 8 is a diagram showing an example of a video-based point cloud compression (V-PCC) bitstream structure as a sequence of V-PCC units. A V-PCC bitstream may comprise a sequence of V-PCC units (e.g., as shown by example in FIG. 8). A V-PCC unit (e.g., each V-PCC unit) may have a V-PCC unit header and/or a V-PCC unit payload. A V-PCC unit header may describe a V-PCC unit type. Table 1 shows examples of V-PCC unit types. An attribute video data V-PCC unit header may specify one or more attribute types and/or indices, which may allow multiple instances of the same attribute type to be supported. Table 2 shows examples of V-PCC attribute types. Occupancy, geometry, and/or attribute video data unit payloads (e.g., as shown by example in FIG. 8) may correspond to video data units (e.g., network abstraction layer (NAL) units) that may be decoded by a video decoder. A video decoder corresponding to a video-coded component sub-bitstream (e.g., each video-coded component sub-bitstream such as an occupancy, geometry, and/or attribute sub-stream) may be signaled in a V-PCC parameter set.

TABLE 1

Examples of V-PCC unit types

| vuh_unit_type | Identifier | V-PCC Unit Type | Description |
|---|---|---|---|
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

TABLE 2

Examples of V-PCC attribute types

| ai_attribute_type_id[ j ][ i ] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 . . . 14 | ATTR_RESERVED | Reserved |
| 15 | ATTR_UNSPECIFIED | Unspecified |

A V-PCC bitstream high-level syntax (HLS) may support, for example, tile groups (e.g., sets of tiles) in one or more atlas frames. An atlas frame may be partitioned into tiles and/or tile groups (e.g., sets of tiles). An atlas frame may be divided, for example, into one or more the rows and/or one or more tile columns. A tile may be, for example, a rectangular region of an atlas frame. A tile group (e.g., a set of tiles) may include one or more tiles of an atlas frame. Tile(s) in a tile group (e.g., a set of tiles) may be independently decidable. The number of tiles in tile groups may vary.

Figure 9:
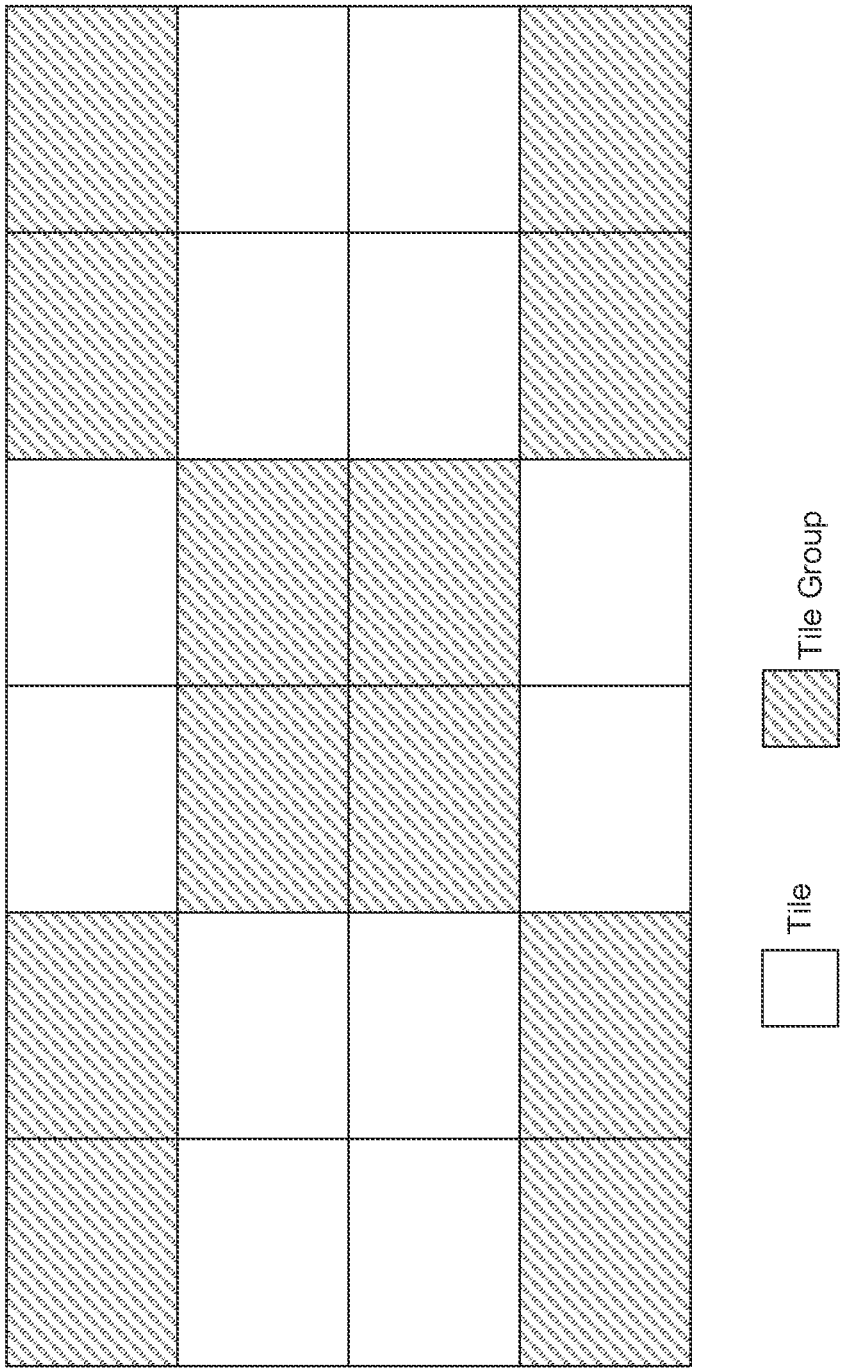
FIG. 9 is a diagram showing an example of tile and tile group partitioning of an atlas frame.

FIG. 9 is a diagram showing an example of tile and tile group partitioning of an atlas frame (e.g., into 24 tiles and nine tile groups). FIG. 9 is shown with alternating shading to distinguish nine tile groups. In examples, rectangular tile group partitioning (e.g., only rectangular tile group partitioning) may be supported. A tile group may include a number of tiles of an atlas frame that collectively form, for example, a rectangular region of the atlas frame (e.g., two or four tiles per tile group as shown by example in FIG. 9). A tile group may include a set of V-PCC tiles associated with an atlas frame.

Supplemental enhancement information (SEI) messages may be signaled in a V-PCC bitstream, for example, to associate patches and/or volumetric shapes (e.g., rectangles) within an atlas frame with objects within a scene represented by a point cloud. SEI messages may enable and/or support annotating, labeling, and/or adding properties to the one or more objects. Objects may correspond to real objects (e.g., physical objects within a scene) and/or conceptual objects (e.g., objects that may relate to physical or other properties). An object may be associated with parameters and/or properties (e.g., different parameters and/or properties), which may, for example, correspond to information (e.g., information provided) during creation and/or editing (e.g., creation and/or editing process(es)) of a point cloud or scene graph. Dependency relationships may be defined between different objects. For example, an object may be part of one or more other objects.

Figure 11:
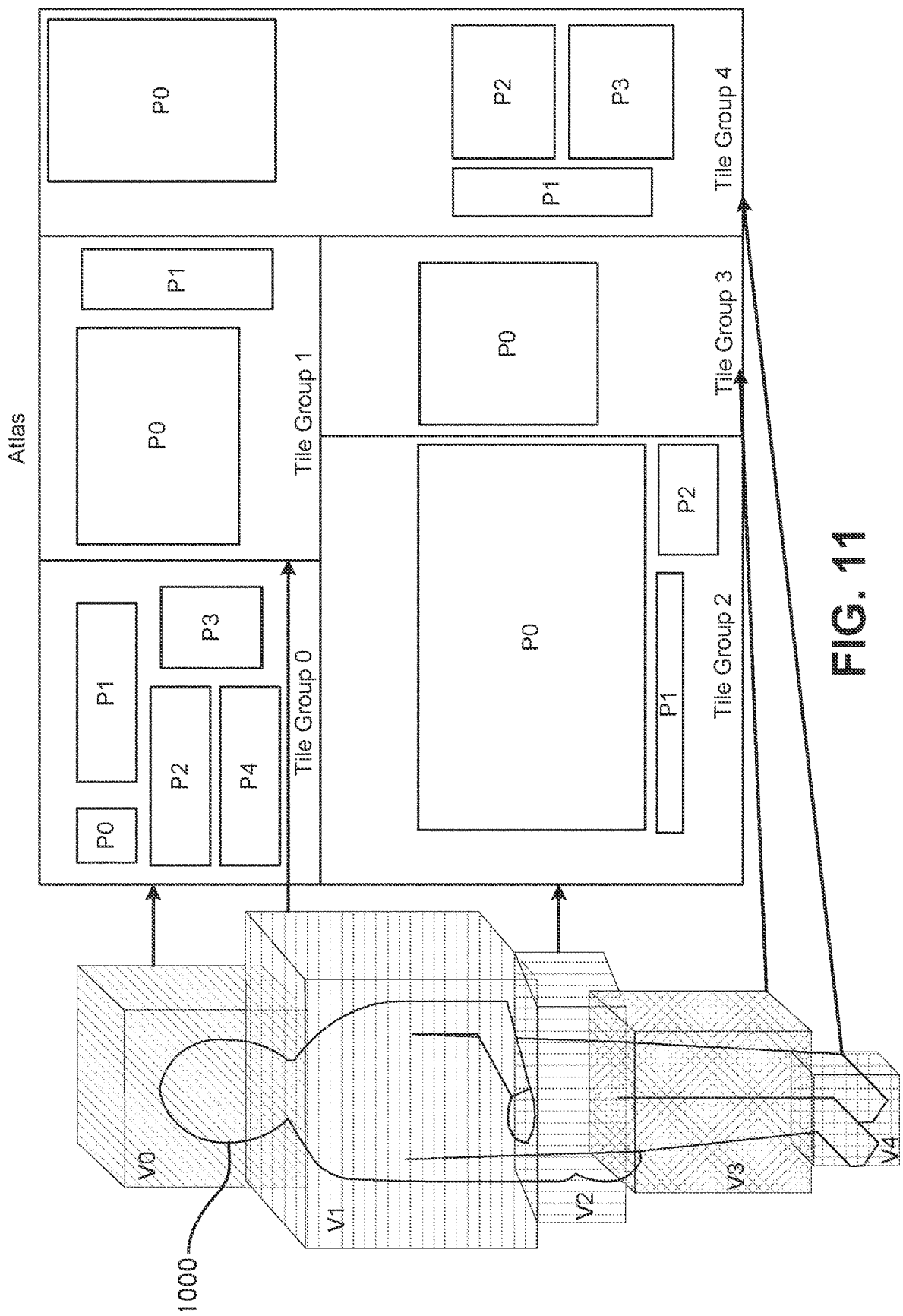
FIG. 11 shows an example of tile mapping of an atlas frame associated with a three dimensional (3D) space.

Objects within a point cloud may be persistent in time or may be updated (e.g., at any time and/or frame). Associated information (e.g., information associated with an object) may persist, for example, until being updated or replaced (e.g., by update/association signaling), or until the end of a bitstream. One or more patches and/or 2D volumetric rectangles may be associated with one or more objects. A 2D volumetric rectangle may include one or more patches, for example, as illustrated in FIG. 11 herein.

Time-based media may be stored in one or more file formats, such as an ISO Base Media File Format (ISOBMFF). A file in a media file format (e.g., ISOBMFF) may include structural and/or media data information, for example, for timed presentations of media data, such as audio, video, etc. A file format (e.g., ISOBMFF) may support un-timed data for example, meta-data at different levels within a file structure. A logical structure of a file may be, for example, a movie that includes a set of time-parallel tracks. A time structure of a file may be, for example, tracks that include sequences of samples in time. Sequences may be mapped into the timeline of the movie (e.g., overall movie). ISOBMFF may be, for example, based on box-structured files. A box-structured file may include a series of boxes (e.g., atoms), which may have a size and a type. A type (e.g., among multiple types) may be, for example, a 32-bit value. A type may be selected or chosen, for example, to be four printable characters, which may be referred to as a four-character code (4CC). Un-timed data may be included, for example, in a metadata box (e.g., at a file level, or attached to a movie box or a stream of timed data, which may be referred to as tracks, within the movie).

An ISOBMFF container may comprise multiple top-level boxes. For example, a MovieBox ('moov') may be a top-level box within an ISOBMFF container. A MovieBox ('moov') may include metadata for continuous media streams that may be present in a file. Metadata may be signaled within the hierarchy of boxes in the Movie box, e.g., within a TrackBox ('trak'). A track may represent a media stream (e.g., a continuous media stream that is present in a file). A media stream may comprise a sequence of samples (e.g., audio and/or video access units of an elementary media stream). Samples may be enclosed within a MediaDataBox ('mdat'), which may be present at the top-level of a container. Metadata for a track (e.g., each track) may include, for example, a list of sample description entries. A sample description entry (e.g., each sample description entry) may provide, for example, a coding and/or encapsulation format that may be used in a track and/or may provide initialization data for processing the coding and/or encapsulation format. A sample (e.g., each sample) may be associated with one or more sample description entries of a track. An explicit timeline map may be defined for a track (e.g., each track), which may be referred to as an edit list. An edit list may be signalled, for example, using an EditListBox, which may have the following syntax. A sample description entry entry (e.g., each sample description entry) may define part of a track timeline, for example, by mapping part of a composition timeline, and/or by indicating 'empty' time (e.g., portions of a presentation timeline that map to no media, resulting in an 'empty' edit).

An example syntax for EditListBox may be provided as follows:

```
aligned(8) class EditListBox extends FullBox('elst', version, flags) {
   unsigned int(32) entry_count;
   for (i=1; i <= entry_count; i++) {
      if (version==1) {
         unsigned int(64) edit_duration;
         int(64) media_time;
      } else { // version==0
         unsigned int(32) edit_duration;
         int(32) median_time;
      }
      int(16) media_rate_integer;
      int(16) media_rate_fraction = 0;
   }
}
```

ISOBMFF may support imposition of one or more actions on a player and/or a renderer. In examples (e.g., for a video stream), a restricted video scheme track may be used to impose one or more actions. For example, post-decoder requirements may be signaled on a video track that is a restricted video scheme track. A track may be transformed into a restricted video scheme track, for example, by setting the track's sample entry code to a four-character code (4CC) (e.g., 'resv') and by adding a RestrictedSchemeInfoBox to the track's sample description (e.g., without modifying other boxes). An original sample entry type, which may be based on the video codec used to encode a stream, may be stored within an OriginalFormatBox within the RestrictedSchemeInfoBox. A RestrictedSchemeInfoBox may include one or more boxes (e.g., three boxes such as OriginalFormatBox, SchemeTypeBox, and SchemeInformationBox). An OriginalFormatBox may store an original sample entry type, which may be based on the video codec used to encode a component stream. The nature of a restriction may be defined in the SchemeTypeBox.

Figure 10:
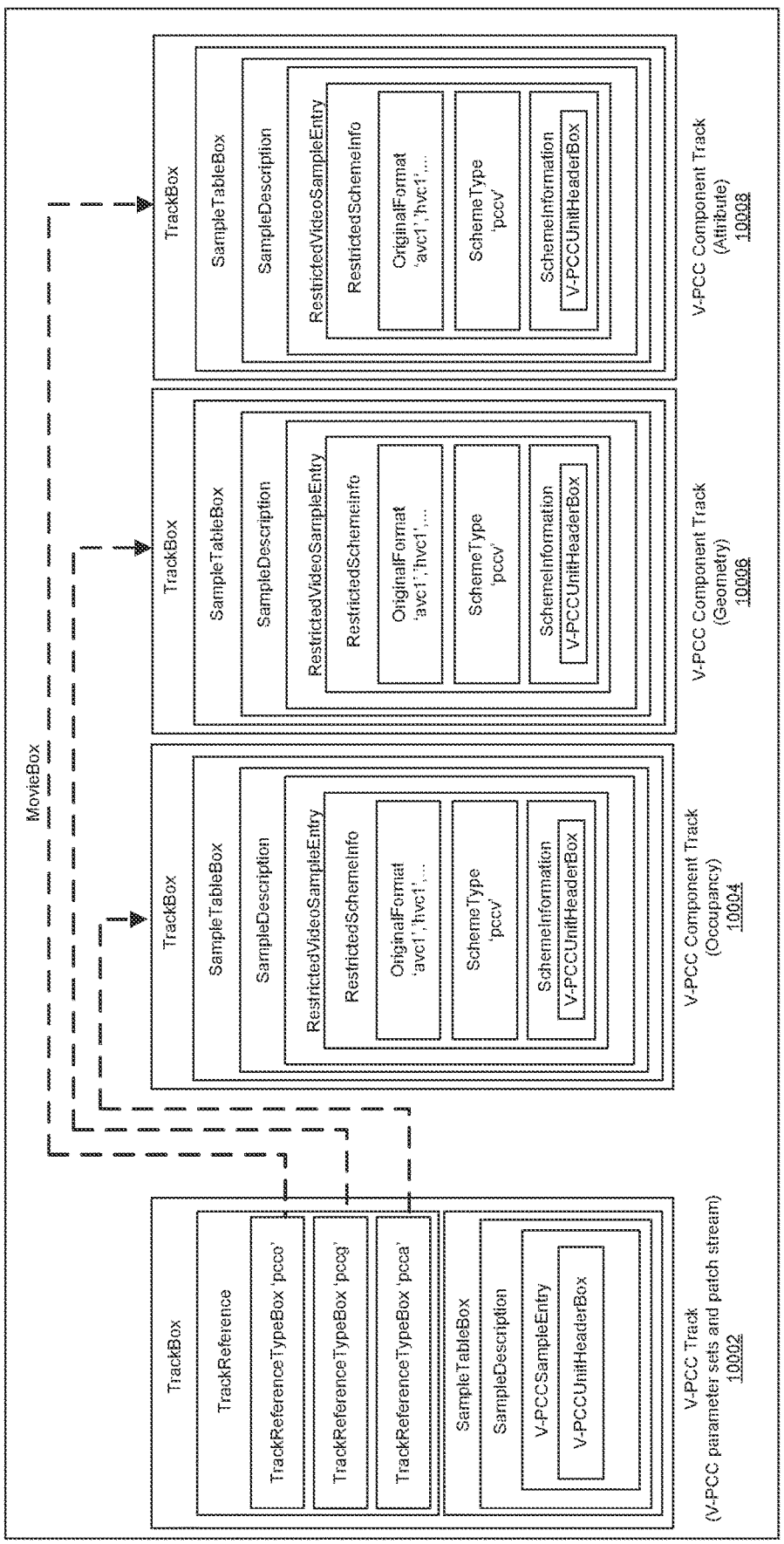
FIG. 10 is a diagram showing an example structure of a multi-track ISOBMFF V-PCC container.

FIG. 10 is a diagram showing an example structure of a multi-track ISOBMFF V-PCC container. In examples, a multi-track V-PCC container may include, for example, one or more of the following. A multi-track V-PCC container may include, for example, a V-PCC track 10002 that includes a V-PCC parameter set and/or atlas sub-bitstream parameter sets (e.g., in the sample entry) and/or samples that may carry atlas sub-bitstream NAL units. V-PCC and VPCC are used interchangeably herein. A track may include track references to other tracks that may, for example, carry payloads of video compressed V-PCC units (e.g., unit types VPCC_OVD, VPCC_GVD, and/or VPCC_AVD). A multi-track V-PCC container may include, for example, a restricted video scheme track, where samples may include access units of a video-coded elementary stream for occupancy map data (e.g., payloads of V-PCC units of type VPCC_OVD). A multi-track V-PCC container may include, for example, one or more restricted video scheme tracks, where samples may include access units of video-coded elementary streams for geometry data e.g., payloads of V-PCC units of type VPCC_GVD). A multi-track V-PCC container may include, for example, zero or more restricted video scheme tracks, where samples may include access units of video-coded elementary streams for attribute data (e.g., payloads of V-PCC units of type VPCC_AVD).

There is an increasing interest in new media (e.g., VR and/or immersive 3D graphics). 3D point clouds may represent immersive media. Immersive medial may enable new forms of interaction and communication with virtual worlds. 3D point clouds may be represented by large volumes of information. Efficient coding (e.g., efficient coding algorithms) may reduce storage and/or transmission resources and time involved in storing and transmitting 3D point cloud data (e.g., dynamic 3D point cloud data).

A point cloud sequence may represent a scene with multiple objects. In examples, individual objects (e.g., represented in a point cloud sequence) may be accessed (e.g., streamed and/or rendered), for example, without decoding other parts of a scene. Similarly, one or more parts of an object (e.g., a single object) represented by a point cloud may be accessed without decoding the entire point cloud.

SEI messages may annotate, label, and/or add properties, e.g., to patches and/or volumetric rectangles. One or more SEI messages may, for example, enable partial access and rendering of a V-PCC sequence. Atlas sub-bitstream data may be carried in a track (e.g., a single track). Carrying sub-bitstream data in a single track may, for example, lead streaming applications to download and decode excess atlas information (e.g., all atlas information), even when a user may be interested (e.g., interested only) in certain regions/objects in V-PCC content, or a subset of the atlases in the V-PCC content, which may, for example, lead to excessive consumption of time and computing resources and degrade user experience. A track (e.g., and associated signaling) may impose restrictions (e.g., undue restrictions) on a signaling of viewports and/or may not be aligned with camera parameters and/or viewport position SEI messages.

File format structures may enable flexible, partial access to different parts of a coded point cloud sequence (e.g., encapsulated in an ISOBMFF container).

V-PCC Atlas tile group tracks may be provided. A tile group (e.g., each set of tiles), or a group of tile groups, may be encapsulated in a separate track (e.g., called an atlas tile group track), for example, if an atlas sub-stream of a V-PCC bitstream includes multiple tile groups. An atlas tile group track may carry NAL units with atlas_tile_group_layer_rbsp( ) payloads for one or more atlas tile groups, for example, to enable access to the tile groups (e.g., direct access to the tile groups).

Patches in an atlas frame that may correspond to spatial regions and/or objects within a point cloud scene may be mapped to atlas tile groups, for example, to support partial access in ISOBMFF containers for V-PCC coded streams. Tile groups may be carried in separate atlas tile group tracks in a container. Players, streaming clients, etc. may be enabled to identify and retrieve tile group tracks (e.g., only the set of tile group tracks) carrying information for rendering selected spatial regions or objects within a point cloud scene, for example, if tile groups are carried in separate atlas tile group tracks in a container.

A V-PCC track 10002 may be linked to one or more atlas tile group tracks, for example, based on a track reference with a track reference type defined using a four-character code (4CC) (e.g., 'pcct'). Track references of the defined track reference type may be used, for example, to link a V-PCC track 10002 to one or more atlas tile group tracks (e.g., to each atlas tile group track). An atlas tile group track (e.g., each atlas tile group track) may be grouped with one or more other video-coded V-PCC component tracks that may be carrying component information for the tile group(s) (e.g., set(s) of tiles) in the atlas tile group track (e.g., using an ISO/IEC 14496-12 track group). A track group definition may include, for example, addresses of tile groups that may be associated with tracks in the track group.

A V-PCC tile group track may be identified, for example, by a sample description (e.g., VPCCTileGroupSampleEntry). A sample entry type for a V-PCC atlas tile group track may be, for example, 'vpt1'. A definition of VPCCTileGroupSampleEntry may be, for example, as follows:
Sample Entry Type: 'vpt1'
Container: Sample Description Box ('stsd')
Mandatory: No
Quantity: Zero or more sample entries may be present

```
class VPCCTileGroupSampleEntry( ) extends VolumetricSampleEntry
('vpt1'){
    VPCCTileGroupConfigurationBox config( ); // optional
}
class VPCCTileGroupConfigurationBox extends Box('vptC') {
    VPCCTileGroupConfigurationRecord( ) vpccTileGroupConfig;
}
aligned(8) class VPCCTileGroupConfigurationRecord {
    unsigned int(8) configurationVersion = 1;
}
```

A sample entry may describe media samples of a V-PCC tile group track. In examples, a VPCCTileGroupSampleEntry may not include a VPCCConfigurationBox. VPCCConfigurationBox may be included in a sample description for the main V-PCC track 10002. Other boxes (e.g., other optional boxes) may be included.

The semantics of fields in VPCCTileGroupSampleEntry may be, for example, as follows.

Parameter compressorname (e.g., in the base class VolumetricSampleEntry) may indicate the name of a compressor used (e.g., the value "\013VPCC Coding"). A first byte may indicate a count of remaining bytes, which may be represented, for example, by \013 (e.g., octal 13, which is decimal 11) as the number of bytes in the rest of a string.

Samples in an atlas tile group track may have, for example, a sample format (e.g., the same sample format) defined for samples of a V-PCC track 10002 (e.g., as provided in ISO/IEC 23090-10). The NAL units carried in atlas tile group track samples may have, for example, a nal_unit_type value within multiple ranges (e.g., an inclusive range of 0 to 5, and an inclusive range of 10 to 21).

In an (e.g., additional or alternative) embodiment, the number and/or layout of tile groups (e.g., set of flies) in atlas frames may be fixed (e.g., for the entire duration of a coded point cloud sequence), for example, to avoid an increase (e.g., an explosion) in the number of tracks in a container file.

In an (e.g., additional or alternative) embodiment, an atlas tile group track may include a track reference to a V-PCC track 10002 for an atlas to which an atlas tile group (e.g., carried by the atlas tile group track) belongs. The track reference may enable a parser to identify a V-PCC track 10002 associated with an atlas tile group track. For example, the parser rosy identify a V-PCC track 10002 associated with an atlas tile group track based on a track identification (ID) for the atlas tile group track.

Atlas tile group tracks and component tracks may be grouped. V-PCC component tracks (e.g., tracks that may carry video-coded occupancy 10004, geometry 10006, and/or attribute information 10008) associated with an atlas tile group track may be grouped together with the track, for example, using the track group with a 'vptg' TrackGroupTypeBox as follows, for example:

```
aligned(8) class VPCCTileGroupBox extends TrackGroupTypeBox('vptg')
{
    unsigned int(8) num_tile_groups_minus1;
    for (i=0; i<=num_tile_groups_minus1; i+++) {
        unsigned int(16) tile_group_id;
    }
}
```

Semantics of the field(s) of VPCCTileGroupBox may be, for example:
  num_tile_groups_minus1 plus 1 may indicate the number of V-PCC tile groups or sets of V-PCC tiles associated with the track group; and
  tile_group_id may indicate an ID for the V-PCC tile group or a set of tiles and may be identical to atgh_address (e.g., in ISO/IEC 23090-5).

In an (e.g., additional or alternative) embodiment, the SpatialRegionGroupBox may be used to group an atlas tile group track and corresponding component tracks, for example, based on an update to syntax of SpatialRegionGroupBox to include a list of associated tile group identifiers (e.g., similar to embodiments described herein):

In an (e.g., additional or alternative) embodiment, a single track reference from a V-PCC track 10002 that may use a track_group_id for a VPCCTileGroupBox may be used to reference (e.g., collectively reference) one or more tracks (e.g., all tracks) that may be associated with a V-PCC tile group (e.g., a V-PCC set of flies) or a set of V-PCC tile groups. In examples, the TrackReferenceTypeBox for the track reference may have an entry in its track_IDs array with a track_group_id for a track group of the V-PCC the group or set of V-PCC tile groups. A bit (e.g., Bit 0 or least significant bit) of flag(s) of the TrackGroupTypeBox may be used, for example, to indicate the uniqueness of the track_group_id. Semantics of the flag may be defined, for example, as follows: bit 0 of the flag(s) (e.g., with bit 0 being a least significant bit) of the TrackGroupTypeBox may be used, for example, to indicate the uniqueness of track_group_id. In examples, (flags & 1) equal to 1 in a TrackGroup- TypeBox of a particular track_group_type may indicate that track_group_id in that TrackGroupTypeBox is not equal to a track_ID value and is not equal to track_group_id of a TrackGroupTypeBox with a different track_group_type. (flags & 1) may be equal to 1 in (e.g., all) TrackGroupTypeBoxes of the (e.g., same) values of track_group_type and track_group_id, respectively, for example, if (flags & 1) is equal to 1 in a TrackGroupTypeBox with particular values of track_group_type and track_group_id.

In an (e.g., additional or alternative) embodiment, a VPCCTileGroupBox may include a track ID for an atlas track to which a tile group track belongs. The VPCCTileGroupBox, for example, may extend a TrackGroupTypeBox 'vptg' as follows:

```
aligned(8) class VPCCTileGroupBox extends TrackGroupTypeBox('vptg')
{
  unsigned int(32) atlas_track_ID;
  unsigned int(8) num_tile_groups_minus1;
  for (i=0; i<=num_tile_groups_minus1; i++) {
    unsigned int(16) tile_group_id;
  }
}
```

In this case, various field(s) (e.g., semantics of the field(s)) of VPCCTileGroupBox may include:
- atls_track_ID, which may be a track ID for an atlas track to which a tile group represented by the VPCCTileGroupBox belongs.
- num_tile_groups_minus1 plus 1, which may be the number of V-PCC tile groups or sets of V-PCC tiles associated with the track group.
- tile_group_id, which may be an ID for the V-PCC tile group (e.g., additionally provided as atgh_address in ISO/IEC 23090-5).

VPCCTileGroupBox may use an atlas ID, for example, as an alternative to using a track ID. VPCCTileGroupBox may use an atlas ID for the atlas sub-bitstream to which the tile group represented by the VPCCTileGroupBox belongs. In this case, a VPCCTileGroupBox, for example, may extend a TrackGroupTypeBox 'vptg' as follows:

```
aligned(8) class VPCCTileGroupBox extends TrackGroupTypeBox('vptg')
{
  unsigned int(6) atlas_id;
  bit(2) reserved = 0;
  unsigned int(8) num_tile_groups_minus1;
  for (i=0; i<=num_tile_groups_minus1; i++) {
    unsigned int(16) tile_group_id;
  }
}
```

In this case, various field(s) (e.g., semantics of the field(s)) of VPCCTileGroupBox may include:
- atlas_id, which may be equal to the atlas ID for the atlas to which the tile group represented by the VPCCTileGroupBox belongs. The atlas_id may be equal to, for example, one of the vps_atlas_id values that may be signaled in the V-PCC parameter set (VPS).
- num_tile_groups_minus1 plus 1, which may be the number of V-PCC tile groups or sets of V-PCC tiles associated with the track group.
- tile_group_id, which may be an ID for the V-PCC tile group (e.g., additionally provided as atgh_address in ISO/IEC 23090-5).

A volumetric metadata track may be a timed-metadata track, which may carry information about one or more objects (e.g., one or more different objects) within a point cloud scene and/or a 3D spatial partitioning. Object information may be carried in the samples of a track. A timed-metadata track may have a defined sample entry (e.g., DynamicVolumetricMetadataSampleEntry) with a 4CC 'dyvm' that may extend MetadataSampleEntry, for example, as follows:

```
aligned(8) class DynamicVolumetricMetadataSampleEntry extends
MetaDataSampleEntry('dyvm') {
  VPCCSpatialRegionsBox( );
}
``` where MetadataSampleEntry may be defined, for example, as follows:
```
class
MetaDataSampleEntry(codingname) extends SampleEntry (codingname) {
}
```
and where VPCCSpatialRegionsBox may be defined, for example, as follows:

Box Types:     'vpsr'
Container:     VPCCSampleEntry ('vpc1' or 'vpcg')
Mandatory:     No
Quantity:      Zero or one

```
aligned(8) class VPCCSpatialRegionsBox extends FullBox('vpsr',0,0) {
    unsigned int(16) num_regions;
    for (i=0; i < num_regions; i++) {
              3DSpatialRegionStruct(1);
              unsigned int(8) num_track_groups;
              for (j=0; j < num_track_groups; j++) {
                unsigned int(32) track_group_id;
                unsigned int(16) nal_group_id;
              }
    }
}
```

The volumetric metadata track may include, for example, a 'cdsc' track reference to the V-PCC track 10002.

One or more samples of a volumetric metadata track may include, for example, a table that may map object identifiers to one or more track groups carrying the V-PCC tile groups (e.g., the V-PCC sets of tiles) mapped to one or more corresponding objects. The one or more samples may include a dependency list for a signaled object (e.g., each signaled object), which may include the identifiers of other objects that the signaled object depends on. Samples of the volumetric metadata track may be defined, for example, as follows:

```
aligned(8) class VPCCVolumetricMetadataSample( ) {
  bit(1) region_updates_flag;
  bit(1) object_updates_flag;
  bit(6) reserved = 0;
  if (region_updates_flag) {
    unsigned int(16) num_regions;
    for (i=0; i < num_regions; i++) {
      3DSpatialRegionStruct(dimensions_included_flag);
    }
  }
  if (object_updates_flag) {
    unsigned int(8) num_obj_updates;
    for (i=0; i<num_objvupdates; i++) {
      unsigned int(8) obj_index_length[i];
      unsigned int(obj_indexvlength[i] * 8) object_id[i];
      bit(1) obj_cancel_flag[i];
      if (obj_cancel_flag[i]) {
        bit(7) reserved = 0;
      } else {
        bit(4) reserved = 0;
        bit(1) obj_spatial_region_mapping_flag[i];
        bit(1) obj_dependencies_present_flag[i];
        bit(1) obj_bounding_box_present_flag[i];
        if (obj_bounding_box_present_flag[i]) {
          3DSpatialRegionStruct(1); // not needed if mapping each
object to 3D region
        }
```

```
        if (obj_spatial_regionvmapping_flag[i]) {
            // mapping object to spatial regions
            unsigned int(8) num_spatial_regions[i];
            for (j=0; j < num_spatial_regions[i]; j++) {
                region_id[j][i];
            }
        } else {
            // mapping object to tile group tracks
            unsigned int(8) num_track_groups[i];
            for (j=0; j < num_track_groups[i]; j++) {
                unsigned int(32) track_group_id[j][i];
            }
        }
        if (obj_dependencies_present_flag[i]) {
            unsigned int(8) num_obj_dependencies[i];
            for (j=0; j < num_objvdepedendencies[i]; j++) {
                unsigned int(8) obj_dep_index_length[j][i];
                unsigned int(obj_dep_index_length[j][i] * 8)
obj_index[j][i];
            }
        }
    }
  }
}
``` where 3DSpatialRegionStruct may be defined, for example, as follows:

```
aligned(8) class 3DPoint( ) {
    unsigned int(16) x;
    unsigned int(16) y;
    unsigned int(16) z;
}
aligned(8) class CuboidRegionStruct( ) {
    unsigned int(16) cuboid_dx;
    unsigned int(16) cuboid_dy;
    unsigned int(16) cuboid_dz;
}
aligned(8) class 3DSpatialRegionStruct(dimensions_included_flag) {
    unsigned int(16) 3d_region_id;
    3DPoint anchor;
    if (dimensions_included_flag) {
        CuboidRegionStruct( );
    }
}
```

Semantics of fields in VPCCVolumetricMetadataSample may include, for example, one or more of the following:
  region_updates_flag may indicate, for example, whether a sample includes updates to 3D spatial regions;
  object_updates_flag may indicate, for example, whether a sample includes updates to point cloud scene objects;
  num_obj_updates may indicate, for example, a number of point cloud scene objects updated in a sample;
  obj_index_length[i] may indicate, for example, a length of the object index (e.g., in number of bytes) for the i-th object in an object update list of a sample;
  object_index[i] may indicate, for example, an index of the i-th object in an object update list of a sample;
  obj_cancel_flag[i] may indicate, for example, whether the i-th object in an object update list of a sample is cancelled;
  obj_spatial_region_mapping_flag[i] may indicate, for example, whether a mapping to a spatial region may be signaled for the i-th object in an object update list of a sample;
  obj_depdendencies_present_flag[i] may indicate, for example, whether object dependency information may be available for the i-th object in an object update list of a sample (e.g., where Value 0 may indicate that the object does not depend on other objects, and Value 1 may indicate that the object depends on one or more objects within a point cloud scene);
  obj_bounding_box_present_flag[i] may indicate, for example, whether 3D bounding boxing information may be available for the i-th object in an object update list of a sample (e.g., where Value 0 may indicate that no bounding box information is given, and Value 1 may indicate that that 3D bounding box information for the i-th object may be signaled in the sample);
  num_spatial_regions[i] may indicate, for example, a number of 3D spatial regions that the i-th object in an object update list of a sample may be associated with;
  region_id[i][i] may indicate, for example, an identifier of the j-th spatial region that the i-th object in an object update list of a sample may be associated with;
  num_track_groups[i] may indicate, for example, a number of track groups that the i-th object in an object update list of a sample may be associated with;
  track_group_id[j][i] may indicate, for example, an identifier of the j-th track group (e.g., the j-th set of tiles) that the i-th object in an object update list of a sample may be associated with;
  num_obj_depedencies[i] may indicate, for example, a number of objects that the i-th object in an object update list of a sample may depend on;
  obj_dep_index_length[j][i] may indicate, for example, a length, in number of bytes, of an index of the j-th object that the i-th object in an object update list of a sample may depend on; or
  obj_index[j][i] may indicate, for example, an index of the j-th object that the i-th object in an object update list of a sample may depend on.

In (e.g., an additional or alternative) embodiment, updated objects in samples of a volumetric metadata track may be mapped (e.g., directly mapped) to V-PCC tile groups (e.g., V-PCC sets of tiles) including, for example, patches associated with one or more objects. A corresponding sample format syntax (e.g., for this embodiment) may be, for example, as follows:

```
aligned(8) class VPCCVolumetricMetadataSample( ) {
    bit(1) region_updates_flag;
    bit(1) object_updates_flag;
    bit(6) reserved = 0;
    if (region_updates_flag) {
        unsigned int(16) num_regions;
        for (i=0; i < num_regions; i++) {
            3DSpatialRegionStruct(dimensions_included_flag);
        }
    }
    if (object_updates_flag) {
        unsigned int(8) num_obj_updates;
        for (i=0; i<num_obj_updates; i++) {
            unsigned int(8) obj_index_length[i];
            unsigned int(obj_index_length[i] * 8) object_id[i];
            bit(1) obj_cancel_flag[i];
            if (obj_cancel_flag[i]) {
                bit(7) reserved = 0;
            } else {
                bit(4) reserved = 0;
                bit(1) obj_spatial_region_mapping_flag[i];
                bit(1) obj_dependencies_present_flag[i];
                bit(1) obj_bounding_box_present_flag[i];
                if (obj_bounding_box_present_flag[i]) {
                    3DSpatialRegionStruct(1); // not needed if mapping each
object to 3D region
                }
                if (obj_spatial_region_mapping_flag[i]) {
                    // mapping object to spatial regions
                    unsigned int(8) num_spatial_regions[i];
```

-continued

```
      for (j=0; j < num_spatial_regions[i]; j++) {
        region_id[j][i];
      }
    } else {
      // mapping object to V-PCC tile groups
      unsigned int(8) num_tile_groups[i];
      for (j=0; j < num_tile_groups[i]; j++) {
        unsigned int(16) tile_group_id[j][i];
      }
    }
    if (obj_dependencies_present_flag[i]) {
      unsigned int(8) num_obj_dependencies[i];
      for (j=0; j < num_obj_depedendencies[i]; j++) {
        unsigned int(8) obj_dep_index_length[j][i];
        unsigned int(obj_dep_index_length[j][i] * 8) obj_index[j][i];
      }
    }
   }
  }
 }
}
```

Semantics for fields in a sample format syntax may be similar, for example, to semantics for fields in a sample format in an embodiment described herein, e.g., with the exception of one or more of the following fields, for example:

num_tile_groups[i] may indicate, for example, the number of V-PCC tile groups or sets of V-PCC tiles that the i-th object in an object update list of a sample may be associated with; or tile_group_id[j][i] may indicate, for example, an identifier of the j-th V-PCC tile group (e.g., j-th V-PCC set of tiles) that the i-th object in an object update list of a sample may be associated with. For example, the identifier may be identical to a value of atgh_address in atlas tile group header for the V-PCC tile group (e.g., where atgh_address may specify a tile group address of a tile group; the value of atgh_address may be inferred to be equal to 0, for example, if not present).

A sample (e.g., any sample) in a volumetric metadata track may be marked as a sync sample. For a sample in the volumetric metadata track, if at least one of the media samples in referenced Visual Volumetric Video-based Coding (V3C) track(s) and the V3C and atlas tile tracks the media sample references, having the same decoding time is a sync sample, the sample may be marked as a sync sample. A sample that does not have the same decoding time as a sync sample may (e.g., or may not) be marked as a sync sample. Sync samples in a timed-metadata track may carry information on spatial regions and/or objects available (e.g., all spatial regions and/or object available) at a timestamp of the sync sample. Non sync samples in a timed-meta data track may carry updates (e.g., only updates) to spatial region and/or 3D object information relative to previous samples up to and including a first preceding sync sample.

In examples, updated objects in samples of a volumetric metadata track may be mapped to track IDs associated with atlas tile group tracks carrying information related to the updated object(s), for example, if track grouping is not used to group tracks belonging to the same atlas tile group and the atlas tile group track is linked to associated component tracks (e.g., using track references). V-PCC component tracks associated with a tile group track may be identified, for example, by following track references from an atlas tile group track.

In an (e.g., additional or alternative) embodiment, samples of volumetric metadata track may carry volumetric annotation SEI messages.

In an (e.g., additional or alternative) embodiment, the volumetric metadata track may replace (e.g., or may be used in conjunction with) dynamic spatial regions timed-metadata track (e.g., as specified in ISO/IEC CD 23090-10), for example, as a generic track that may carry metadata for 3D spatial regions and/or objects within the point cloud scene.

V-PCC atlas tracks may be provided. An atlas sub-bitstream (e.g., each atlas sub-bitstream) may be carried in a separate track called an atlas track, for example, if a V-PCC bitstream has more than one atlas sub-bitstream. An atlas track may carry (e.g., carry only) atlas NAL units that belong to an atlas sub-bitstream associated with a track. NAL units associated with one or more tile groups (e.g., one or more sets of tiles) may be carried in a separate atlas tile group track, for example, if an atlas sub-bitstream associated with an atlas track includes multiple atlas tile groups (e.g., multiple atlas sets of tiles).

Atlas sub-bitstreams of a V-PCC bitstream may be carried in separate atlas tracks. A V-PCC track 10002 may include track references (e.g., of a certain type, defined using a 4CC) to each atlas track, which may link a main track to the atlas tracks.

A V-PCC atlas track may be identified, for example, by a VPCCAtlasSampleEntry sample description. A sample entry type for a V-PCC atlas track may be, for example, 'vpa1' or 'vpag.' A definition of a VPCCAtlasSampleEntry may be, for example, as follows:
Sample Entry Type: 'vpa1', 'vpag'
Container: Sample Description Box ('stsd')
Mandatory: A 'vpa1' or 'vpag' sample entry is mandatory
Quantity: One or more sample entries may be present

```
class VPCCAtlasSampleEntry( ) extends VolumetricSampleEntry ('vpa1'){
  VPCCAtlasConfigurationBox config( ); // optional
}
class VPCCAtlasConfigurationBox extends Box('vpaC') {
  VPCCAtlasConfigurationRecord( ) vpccAtlasConfig;
}
aligned(8) class VPCCAtlasConfigurationRecord {
  unsigned int(8) configurationVersion = 1;
  unsigned int(2) lengthSizeMinusOne;
  bit(6) reserved = 1;
  unsigned int(8) numOfSetupUnitArrays;
  for (j=0; j < numOfSetupUnitArrays; j++) {
    bit(1) array_completeness;
    bit(1) reserved = 0;
    unsigned int(6) NAL_unit_type;
    unsigned int(8) numNALUnits;
    for (i=0; i < numNALUnits; i++) {
      unsigned int(16) SetupUnitLength;
      nal_unit (SetupUnitLength) setupUnit; // (e.g., as defined in ISO/IEC 23090-5)
    }
  }
}
```

A sample entry (e.g., as shown by examples herein) may describe media samples of a V-PCC atlas track. In examples, a VPCCAtlasSampleEntry may not include a VPCCConfigurationBox. For example, the VPCCConfigurationBox may be included in a main V-PCC track's sample description. Other boxes (e.g., other optional boxes) may be included.

Semantics of the fields in VPCCAtlasSampleEntry may include, for example, one or more of the following:

compressorname (e.g., in the base class VolumetricSampleEntry) may indicate, for example, the name of a compressor used with a value (e.g., "\013VPCC Coding"), where, for example, a first byte may be a count of remaining bytes (e.g., represented by \013, where 13 (e.g., octal 13) is 11 (e.g., decimal 11) and the number of bytes in the rest of the string);

lengthSizeMinusOne plus 1 may indicate, for example, a length (e.g., in bytes) of the NALUnitLength field in a sample in an atlas stream to which a configuration record applies (e.g., a size of one byte may be indicated with a value of 0), where the value of the field may be equal to ssnh_unit_size_precision_bytes_minus1 in sample_stream_nal_header( ) for the atlas substream;

numOfSetupUnitArrays may indicate, for example, the number of arrays of atlas NAL units of indicated type(s);

array_completeness may indicate, for example, (e.g., if equal to 1) that atlas NAL units (e.g., all atlas NAL units) of a given type may be in a following array and none are in a stream, or (e.g., if equal to 0) may indicate that additional atlas NAL units of an indicated type may be in the stream (e.g., where default and permitted values may be constrained by a sample entry name);

NAL_unit_type may indicate, for example, a type of atlas NAL units in a following array (e.g., which may have an indicated type), where an NAL_unit_type may have a value (e.g., as defined in ISO/IEC 23090-5), and/or where an NAL_unit_type may be restricted to one or more values indicating, for example, a NAL_ASPS, NAL_AFPS, NAL_PREFIX_SEI, and/or NAL_SUFFIX_SEI atlas NAL unit;

numNALUnits may indicate, for example, the number of atlas NAL units of an indicated type that may be included in a configuration record for a stream to which a configuration record may apply, where the SEI array may include (e.g., only include) SEI messages of a declarative nature (e.g., SEI messages that provide information about the stream as a whole, such as a user-data SEI);

SetupUnitLength may indicate the size (e.g., in bytes) of a setupUnit field, where a length field may include, for example, the size of a NAL unit header and/or a NAL unit payload, and may not include, for example, the length field; or setupUnit may contain an NAL unit of type NAL_ASPS, NAL_AFPS, NAL_PREFIX_SEI, or NAL_SUFFIX_SEI (e.g., as defined in ISO/IEC 23090-5), where . NAL_PREFIX_SEI or NAL_SUFFIX_SEI (e.g., if present in setupUnit) may contain SEI messages of a 'declarative' nature.

Tracks for an atlas (e.g., the same atlas) may be grouped, in examples, tracks (e.g., all tracks) that carry information that belong to an atlas sub-bitstream (e.g., the same atlas sub-bitstream) may be grouped together, for example, using track grouping (e.g., as described in ISO/IEC 14496-12) and/or a defined track group type. A track group for an atlas may include, for example, an atlas track and atlas tile group tracks and V-PCC component tracks that may be associated with the atlas. The track group type may be defined, for example, using a 'vpsg' TrackGroupTypeBox, for example, as follows (e.g., where TrackGroupTypeBox may have a track_group_id field defined in ISO/IEC 14496-12):

```
aligned(8) class VPCCAtlasGroupBox extends
    TrackGroupTypeBox('vpsg') {
    unsigned int(6) atlas_id;
    bit(2) reserved = 0;
}
```

Semantics of the field(s) of a VPCCAtlasGroupBox may include, for example:

atlas_id may indicate, for example, an index of an atlas that tracks in a track group may be associated with, where, for example, the value of the index may be in the inclusive range of 0 to 63.

Static spatial regions may be signaled. Static 3D spatial regions may be defined for V-PCC content. Atlas tile groups may be carried in separate tracks. A VPCCSpatialRegionsBox (e.g., as provided in ISO/IEC 23090-10) may be extended to indicate (e.g., using a flag, such as all_tiles_in_single_track_flag) whether the tile groups (e.g., all the sets of tiles) are carried in a single atlas track or each of the tile groups (e.g., each of the sets of tiles) is carried separately in atlas tile groups tracks. As provided in the example syntax herein, a VPCCSpatialRegionsBox based on a flag may associate a track group ID for a track group of various tracks (e.g., all tracks) corresponding to an atlas tile group track with a 3D spatial region (e.g., a 3D spatial region signaled in the VPCCSpatialRegionsBox).

An example syntax for VPCCSpatialRegionsBox may be provided as follows:

```
aligned(8) class V3CSpatialRegionsBox extends FullBox('vpsr',0,0) {
    bit(1) all_tiles_in_single_track_flag;
    bit(7) reserved = 0;
    unsigned int(16) num_regions;
    for (i=0; i < num_regions; i++) {
        3DSpatialRegionStruct(1);
        unsigned int(8) num_track_groups;
        for (j = 0; j < num_track_groups; j++) {
            if (all_tiles_in_single_track_flag == 1) {
                unsigned int(32) component_track_group_id; // for track group containing components
                unsigned int(16) nal_group_id; // for atlas track with (e.g., all) tiles
            } else {
                unsigned int(32) tile_track_group_id;
            }
        }
    }
}
```

Various fields for the VPCCSpatialRegionsBox may include:

all_tiles_in_single_track_flag, which may indicate whether tiles (e.g., all tiles) are carried in a V3C track for a corresponding atlas or whether the tiles (e.g., all the tiles) are carried separately in atlas tile tracks. A value of 1 may indicate, for example, that the tiles (e.g., all the tiles) are carried in the V3C track. A value of 0 may indicate, for example, that the flies are carried in separate atlas tiles;

component_track_group_id, which may identify a track group for tracks that carry V3C components for an associated 3D spatial region; or tile_track_group_id, which may identify a track group for atlas tile tracks of an associated 3D spatial region.

In examples, track IDs (e.g., only track IDs) of atlas tile group tracks associated with a 3D spatial region may be signaled and component tracks for the atlas tile track may be identified (e.g., by following track references from the atlas tile group track to the component tracks), for example, if track grouping is not used to group tracks belonging to an atlas tile group (e.g., the same atlas tile group) and the atlas tile group track is linked to associated component tracks using track references.

The example syntax for VPCCSpatialRegionsBox may be as follows:

```
aligned(8) class V3CSpatialRegionsBox extends FullBox('vpsr',0,0) {
  bit(1) all_tiles_in_single_track_flag;
  bit(7) reserved = 0;
  unsigned int(16) num_regions;
  for (i=0; i < num_regions; i++) {
    3DSpatialRegionStruct(1);
    unsigned int(8) num_track_groups;
    for (j=0; j < num_track_groups; j++) {
      if (all_tiles_in_single_track_flag == 1) {
        unsigned int(32) component_track_group_id; // for track group containing components
        unsigned int(16) nal_group_id; // for atlas track with all tiles
      } else {
        unsinged int(32) tile_track_id;
      }
    }
  }
}
```

In examples, tile_track_id may represent a track ID for an atlas tile group track associated with a 3D spatial region.

Systems, methods, and/or instrumentalities of signaling viewport information may be implemented. In examples, one or more camera parameters may be signaled. A six degrees-of-freedom (6DoF) viewport may be defined by two types of camera parameters, for example: extrinsic camera parameters and intrinsic camera parameters. Extrinsic camera parameters may be signaled (e.g., using ExtCameraInfoStruct data structure.

An example syntax for a ExtCameraInfoStruct data structure may be as follows.

```
aligned(8) class ExtCameraInfoStruct( ) {
  // position
  signed int(32) pos_x;
  signed int(32) pos_y;
  signed int(32) pos_z;
  // orientation
  signed int(32) quat_x;
  signed int(32) quat_y;
  signed int(32) quat_z;
}
```

Semantics for the fields defined in ExtCameraInfoStruct may be as follows.
  pos_x, pos_y, and pos_z may indicate the x, y and z coordinates, respectively, of the position of a viewport (e.g., in meters) in the global reference coordinate system. Values of the coordinates may be in units of $2^{-16}$ meters.
  quat_x, quat_y, and quat_z, may indicate the x, y and z components, respectively, of a rotation of a viewport region using quaternion representation. Values of the coordinates may be a floating-point value in the inclusive range of −1 to 1. The values may specify the x, y and z components, namely qX, qY and qZ, for rotations that are applied to convert the global coordinate axes to local coordinate axes of a camera using the quaternion representation. The fourth component of a quaternion qW may be calculated as follows:

$$qW = \sqrt{1-(qX^2+qY^2+qZ^2)}$$

The point (w, x, y, z) may represent a rotation around the axis directed by the vector (x, y, z) by an angle $2*\cos^{-1}(w) = 2*\sin^{-1}(\sqrt{x^2+y^2+z^2})$.

Intrinsic camera parameters may be signaled, for example, using an IntCameraInfoStruct data structure.

Viewport information (e.g., using a ViewportInfoStruct data structure), for example, based on extrinsic and intrinsic camera parameters, may be signaled.

An example syntax for a ViewportInfoStruct data structure may be as follows.

```
aligned(8) class ViewportInfoStruct(ext_camera_flag, int_camera_flag)
{
  if (ext_camera_flag == 1) {
    bit(1) center_view_flag;
    bit(6) reserved = 0;
    if (center_view_flag == 0) {
      bit(1) left_view_flag;
    } else {
      bit(1) reserved = 0;
    }
    ExtCameraInfoStruct extCamInfo( );
  }
  if (int_camera_flag == 1) {
    IntCameraInfoStruct intCamInfo( );
  }
}
```

Semantics for the fields defined in ViewportInfoStruct may be as follows.
  center_view_flag may be a flag indicating whether the signaled viewport position corresponds to a center of a viewport and/or to one of two stereo positions of the viewport. Value 1 may indicate that the signaled viewport position corresponds to the center of the viewport. Value 0 may indicate that the signaled viewport position corresponds to one of two stereo positions of the viewport.
  left_view_flag may be a flag indicating whether signaled viewport information corresponds to a left stereo position or a right stereo position of a viewport. Value 1 may indicate that the signaled viewport information corresponds to the left stereo position of the viewport. Value 0 may indicate that the viewport information signaled corresponds to the right stereo positions of the viewport.
  extCamInfo may be an instance of ExtCameraInfoStruct defining extrinsic camera parameters for a viewport.
  intCamInfo may be an instance of IntCameraInfoStruct defining intrinsic camera parameters for a viewport.

A viewport timed-metadata track may be implemented. In examples, a generic timed-metadata track for indicating 6DoF viewports may include a ViewportInfoSampleEntry in a SampleDescriptionBox. A purpose for the timed metadata track may be indicated by a track sample entry type. An example ViewportInfoSampleEntry data structure may include a ViewportConfigurationBox data structure (e.g., one ViewportConfigurationBox data structure).

An example syntax for the ViewportConfigurationBox data structure may be as follows.

```
aligned(8) class ViewportConfigurationBox
  extends FullBox('6vpc', version=0, 0) {
  bit(1) dynamic_int_camera_flag;
  bit(1) dynamic_ext_camera_flag;
  bit(6) reserved = 0;
  if (dynamic_int_camera_flag == 0) {
```

```
        IntCameraInfoStruct( );
    }
    if (dynamic_ext_camera_flag == 0) {
        ExtCameraInfoStruct( );
    }
}
aligned(8) class ViewportInfoSampleEntry(type)
    extends MetadataSampleEntry (type) {
    ViewportConfigurationBox( ); // mandatory
    Box[ ] other_boxes; // optional
}
```

Semantics for the fields defined in the ViewportConfigurationBox data structure may be as follows.

dynamic_int_camera_flag equal to 0 may indicate that intrinsic camera parameters are fixed for at samples referring to a sample entry, if dynamic_ext_camera_flag is equal to 0, dynamic_int_camera_flag may be equal to 0, dynamic_ext_camera_flag equal to 0 may indicate that extrinsic camera parameters are fixed for at samples referring to a sample entry.

A sample format of a viewport metadata track (e.g., at viewport metadata tracks) may start with a common part and may be followed by an extension part that may be specific to a sample entry of the viewport metadata track. The sample format for the viewport metadata track may be implemented.

An example syntax for a ViewportInfoSample data structure may be as follows,

```
aligned(8) class ViewportInfoSample( ) {
    unsigned int(8) num_viewports;
    for (i=1; i <= num_viewports; i++) {
        unsigned int(7) viewport_id[i];
        bit(1) viewport_cancel_flag[i];
        if (!viewport_cancel_flag[i]) {
            bit(1) int_camera_flag[i];
            bit(1) ext_camera_flag[i];
            bit(6) reserved = 0;
            ViewportInfoStruct(ext_camera_flag[i],
int_camera_flag[i]);
        }
    }
}
```

Semantics for the fields defined in ViewportInfoSample may be as follows.

num_viewports may indicate the number of viewports signaled in a sample.

viewport_id[i] may be an identifier number that may be used to identify the i-th viewport.

viewport_cancel_flag[i] equals 1 may indicate that the viewport with the id viewport_id[i] may have been cancelled. Indicates that viewport information for the i-th viewport follows (e.g., which may be conditioned on the flag value being 0).

int_camera_flag[i] equal to 1 may indicate that the intrinsic camera parameters are present in the i-th viewport camera parameter set for a current sample. int_camera_flag[i] may be equal to 0, e.g., if dynamic_int_camera_flag equals 0. Moreover, int_camera_flag[i] may be set as 0, e.g., if ext_camera_flag equals to 0.

ext_camera_flag[i] equal to 1 may indicate that the extrinsic camera parameters are present in the i-th viewport camera parameter set for a current sample. ext_camera_flag[i] may be equal to 0, e.g., if dynamic_camera_flag[i] equals 0.

If a viewport timed metadata track is present, extrinsic camera parameters expressed by ExtCameraInfoStruct( ) may be present, for example, at a sample entry or a sample level. The following may be prohibited from concurrently happening: dynamic_ext_camera_flag equals 0 for at samples and ext_cam_flag[i] equals 0 for at samples.

If a timed-metadata track is linked to one or more media tracks with a 'cdsc' track reference, the timed-metadata track may describe the one or more media tracks (e.g., each media track) individually.

A recommended viewport may be implemented. A recommended viewport metadata track may include a RecommendedViewportSampleEntry data structure. The RecommendedViewportSampleEntry data structure may extend a ViewportInfoSampleEntry data structure and may include an additional RecommendedViewportInfoBox that may identify the type of recommended viewports signaled in the recommended viewport metadata track.

An example syntax for the RecommendedViewportSampleEntry data structure may be as follows:

```
aligned(8) class RecommendedViewportInfoBox
    extends FullBox('6rvi', version=0, 0) {
    unsigned int(7) viewport_type;
    bit(1) reserved = 0;
    string viewport_description;
}
class RecommendedViewportSampleEntry( ) extends
ViewportInfoSampleEntry('6rvp') {
    RecommendedViewportInfoBox( ); // mandatory
}
```

Semantics for the fields defined in RecommendedViewportInfoBox may be as follows.

viewport_type may specify a type of a viewport, as listed in TABLE 3, for all samples referring to a sample entry including the RecommendedViewportInfoBox.

viewport_description may be a null-terminated UTF-8 string that provides a textual description of s viewport type.

TABLE 3 shows examples of viewport types.

TABLE 3

| Viewport types | |
|---|---|
| Value | Description |
| 0 | A recommended viewport per the director's cut, e.g., a viewport suggested according to the creative intent of the content author or content provider |
| 1 | A recommended viewport selected based on measurements of viewing statistics |
| 2 | A recommended viewport based on the selected viewport of another user |
| 3 . . . 110 | Reserved |
| 111 . . . 127 | Unspecified (for use by applications or external specifications) |

Samples in a viewport metadata track may have the same format as ViewportInfoSample.

An initial viewport may be implemented. In examples, metadata may indicate the initial viewport that should be used, for example, if playing associated media tracks.

If playing a file (e.g., and when the file includes an initial viewport metadata track), players may be expected to parse the initial viewport metadata track associated with a media track and obey the initial viewport metadata track when rendering the media track.

A data structure, ViewportInfoSampleEntry, may be implemented, for example, with a sample entry type '6inv' which may be used for an initial viewport metadata track.

Samples of the initial viewport track may be implemented.

An example syntax for the InitialViewportSample data structure may have the following format.

```
aligned(8) class InitialViewportSample( ) extends ViewportInfoSample( )
{
    unsigned int(1) refresh_flag;
    bit(7) reserved = 0;
}
```

Semantics for the fields defined in InitialViewportSample may be as follows.

refresh_flag equal to 0 may specify that signaled viewport(s) should be used, for example, if starting a playback from a time-parallel sample in an associated media track. refresh_flag equal to 1 may specify that signalled viewport(s) should always be used, for example, if rendering a time-parallel sample of each associated media track, e.g., both in continuous playback and when starting the playback from the time-parallel sample.

Spatial scalability may be supported. In examples, patches (e.g., in V3C) may support a feature that enables subsampling a patch across different dimensions before coding the patch's associated information. The feature may be referred to as a level of detail (LoD) patch mode. Atlas tiles may permit partitioning an atlas into independently decodable rectangular regions. In an example, the patches in the independently decodable rectangular regions may not be allowed to use information from patches in other independently decodable rectangular regions. Combining atlas tiles and a patch LoD mode may enable a variety of scalability features for use in different applications.

LoDs (levels of detail) of static spatial regions may be signaled. To signal the LoDs of static spatial regions, syntax of a V3CSpatialRegionsBox may be extended by introducing an additional spatial_scalability_enabled_flag. The spatial_scalability_enabled_flag may signal whether multiple LoDs are supported for carried V3C content. If the flag is set, a 3D spatial region (e.g., each 3D spatial region) signaled in the V3CSpatialRegionsBox may include an additional num_lods field that indicates the number of LoDs available for the 3D spatial region. For each LoD associated with a spatial region, the characteristics of the LoD may be signaled. In an example, a mapping to the corresponding tile IDs for the tiles containing the patches for the LoD may be signaled.

An example syntax for V3CSpatialRegionsBox data structure (e.g., extensions to support multiple LoDs) may have the following format.

```
aligned(8) class LoDInfoStruct( ) {
    unsigned int(16) lod_scale_min_x;
    unsigned int(16) lod_scale_min_y;
    unsigned int(16) lod_scale_max_x;
    unsigned int(16) lod_scale_max_y;
}
aligned(8) class
3DRegionTileMappingStruct(all_tiles_in_single_track_flag) {
    if (all_tiles_in_single_track_flag) {
        unsigned int(8) num_track_groups;
        for (j=0; j < num_track_groups; j++) {
            unsigned int(32) component_track_group_id;
            unsigned int(8) num_tiles;
            for (k=0; k < num_tiles; k++) {
                unsigned int(16) tile_id;
            }
        }
    } else {
        unsigned int(8) num_tile_tracks;
        for (j=0; j < num_tile_tracks; j++) {
            unsigned int(32) tile_track_id;
        }
    }
}
aligned(8) class ObjectTileMappingStruct( ) {
    unsigned int(obj_idx_length * 8) soi_object_idx;
    unsigned int(8) obj_num_tiles;
    for (k=0; k < obj_num_tiles; k++) {
        unsigned int(16) obj_tile_id;
    }
}
aligned(8) class V3CSpatialRegionsBox extends FullBox('vpsr', 0 ,0) {
    bit(1) all_tiles_in_single_track_flag;
    bit(1) spatial_scalability_enabled_flag;
    bit(6) reserved = 0;
    unsigned int(16) num_regions;
    for (i=0; i < num_regions; i++) {
        3DSpatialRegionStruct(1);
        if (spatial_scalability_enabled_flag) {
            unsigned int(8) num_lod;
            for (j=0; j < num_lod; j++) {
                unsigned int(8) lod_id;
                LoDInfoStruct( );
                3DRegionTileMappingStruct(all_tiles_in_single_track_flag);
            }
        } else {
            3DRegionTileMappingStruct(all_tiles_in_single_track_flag);
        }
        unsigned int(8) num_objects;
        unsigned int(8) obj_idx_length;
        for (j=0; j < num_objects; j++)
            ObjectTileMappingStruct( );
    }
}
```

Semantics for the fields defined above may be as follows:

lod_scale_min_x and lod_scale_min_y may indicate a minimum LoD scaling factor for a local x and y coordinate of one or more patches in one or more tiles associated with a LoD (e.g., a minimum pdu_lod_scale_x_minus1 value and a minimum pdu_lod_scale_y_idc value, respectively, across the patches (e.g., all the patches) in the LoD).

lod_scale_max_x and lod_scale_max_y may indicate a maximum LoD scaling factor for a local x and y coordinate of one or more patches in the one or more tiles associated with a LoD (e.g., a maximum pdu_lod_scale_x_minus1 value and a maximum pdu_lod_scale_y_idc value, respectively, across the patches (e.g., all the patches) in the LoD).

LoDs of dynamic spatial regions may be signaled. To signal the LoDs of dynamic spatial regions, a sample format for one or more samples of a volumetric metadata track may support signaling the LoDs for a spatial region (e.g., each spatial region) listed in the sample(s). A mapping between the LoDs and the atlas tiles containing patches for a LoD (e.g., each LoD) may be signaled.

An example syntax for a VPCCVolumetricMetadataSample data structure may have the following format.

```
aligned(8) class VPCCVolumetricMetadataSample( ) {
    bit(1) region_updates_flag;
    bit(1) object_updates_flag;
```

```
        bit(6) reserved = 0;
        if (region_updates_flag) {
            unsigned int(16) num_regions;
            for (i=0; i < num_regions; i++) {
                3DSpatialRegionStruct(dimensions_included_flag);
                bit(1) update_mapping_flag;
                bit(7) reserved = 0;
                if (update_mapping_flag) {
                    if (spatial_scalability_enabled_flag) {
                        unsigned int(8) num_lod;
                        for (j=0; j < num_lod; j++) {
                            unsigned int(8) lod_id;
                            LoDInfoStruct( );
                    3DRegionTileMappingStruct(all_tiles_in_single_track_flag);
                        }
                    } else {
                    3DRegionTileMappingStruct(all_tiles_in_single_track_flag);
                    }
                }
            }
        }
        if (object_updates_flag) {
            ...
        }
    }
```

In examples, an object_updates_flag may be associated with one or more of objects added, and/or objects removed.

Player behavior may be implemented based on adaptive LoD. In examples, a player may identify the presence of dynamic volumetric metadata, for example, if parsing a file and finding a timed-metadata track with a DynamicVolumetricMetadataSampleEntry and a 'cdsc' track reference to a V3C track. For example, i if no dynamic volumetric metadata track is associated with a main track for V3C content and a V3CSpatialRegionsBox is present in the main track, a set of static 3D spatial regions may be associated with the V3C content. At a point in time (e.g., any point in time) during playback, the player may identify a set of target 3D spatial regions based on a current viewport and characteristics of one or more spatial regions signaled in a V3CSpatialRegionsBox (e.g., in the case of static spatial regions), or in the samples of the dynamic volumetric metadata track (e.g., in the case of dynamic spatial regions). For example, if scalability is enabled for the 3D spatial regions and/or objects signaled in the V3CSpatialRegionsBox or the samples in the dynamic volumetric metadata track, the player may decide on a desired LoD for each of the target spatial regions based on one or more constraints (e.g., current viewport and/or available network bandwidth). For each target LoD of each target spatial region, the player may identify the tile IDs for tiles associated with the LoD based on a mapping in the V3CSpatialRegionsBox or the samples of the dynamic volumetric metadata track. A player may identify the atlas tile tracks that carry the tiles associated with the target LoDs (e.g., by checking the tile IDs in the sample entry of the atlas tile tracks). Corresponding component tracks may be identified by following track references from selected atlas tile tracks to the component tracks.

LoD information may be signaled in atlas tile tracks. To facilitate efficient access to the LoDs, tiles carried by an atlas tile track may be restricted to tiles associated with the same LoD. In the case of streaming applications, this may enable a player and/or streaming client to download data from the tile tracks that provide the target LoD.

An example syntax for AltasTileSampleEntry may enable signaling LoD information for the tiles carried by the atlas tile track.

```
aligned(8) class AtlasTileSampleEntry( ) extends
VolumetricVisualSampleEntry ('v3t1') {
    unsigned int(8) configurationVersion = 1;
    unsigned int(2) lengthSizeMinusOne;
    bit(1) spatial_scalability_enabled_flag;
    bit(5) reserved = 0;
    if (spatial_scalability_enabled_flag) {
        unsigned int(8) lod_id;
        LoDInfoStruct( );
    }
    unsigned int(16) num_tiles;
    for(i=0; i < num_tiles; i++){
        unsigned int(16) tile_id;
    }
}
```

Semantics for the fields defined above may be as follows:
spatial_scalability_enabled_flag may indicate whether LoD mode is enabled for an atlas tile track.
lod_id may be an identifier for an LoD.
LoDInfoStruct( ) may be an instance of LoDInfoStruct, which carries information on an LoD.

In examples, an atlas tile may include tile tracks associated with different LoDs.

An example syntax for AtlasTileSampleEntry may be provided, for example, to support the two use cases (e.g., single LoD for atlas tile track and multiple LoDs per tile in the atlas tile track), as follows.

```
aligned(8) class AtlasTileSampleEntry( ) extends
VolumetricVisualSampleEntry ('v3t1') {
    unsigned int(8) configurationVersion = 1;
    unsigned int(2) lengthSizeMinusOne;
    bit(1) spatial_scalability_enabled_flag;
    if (spatial_scalability_enabled_flag) {
        bit(1) single_lod_flag;
        bit(4) reserved = 0;
    } else {
        bit(5) reserved = 0;
    }
    if (spatial_scalability_enabled_flag && single_lod_flag) {
        unsigned int(8) lod_id;
        LoDInfoStruct( );
    }
    unsigned int(16) num_tiles;
    for(i=0; i < num tiles; i++){
        unsigned int(16) tile_id;
        if (spatial_scalability_enabled_flag && !single_lod_flag) {
            unsigned int(8) lod_id;
            LoDInfoStruct( );
        }
    }
}
```

Semantics for the flag disclosed above may be as follows.
single_lod_flag may indicate whether all tiles carried by an atlas tile track belong to the same LoD or not. Value 1 may indicate that all the tiles belong to the same LoD. Otherwise, each tile may be associated with a different LoD.

FIG. 11 shows an example of tile mapping of an atlas frame associated with a 3D space. The 3D space may be partitioned into one or more spatial regions, shown in FIG. 11 as V0, V1, V2, V3, and V4. Each of the spatial regions may be mapped to a set of V-PCC tiles (e.g., a V-PCC tile group) associated with an atlas frame. V0, V1, V2, V3, and V4 may be mapped to tile groups 0, 1, 2, 3, and 4, respectively. Mapping each of the spatial regions to the set of tiles may be based on the identifications (e.g., tile_group_id), as described with respect to FIG. 10.

Mapping information associated with the mapping of each spatial region to a set of tiles may be carried in multiple tracks. For example, mapping information associated with mapping spatial region V0 to tile group 0 may be carried in track 0, while mapping information associated with mapping spatial region V1 to tile group 1 may be carried in track 1. Track identifications (e.g., track_group_id), as described with respect to FIG. 10, may be used to coordinate the mapping information. The tracking identifications and/or tile identifications may be signaled in a timed-metadata V-PCC bitstream. In such a case, track(s) associated with the signaled tracking identification may be decoded and may present mapping information to an associated set of tiles.

An object 11000 may be associated with one or more spatial regions. The object may be an area and/or item that a user may be interested in. One or more flags (e.g., obj_spatial_region_mapping_flag[i]) may be used to indicate that the object is associated with one or more spatial region, as described with respect to FIG. 10. The flags may be signaled in a timed-metadata V-PCC bitstream.

One or more flags may be used to indicate a change (e.g, an update) associated with spatial region(s) (e.g., region_updates_flag) and/or object(s) (e.g., object_updates_flag), as described in FIG. 10. The flag(s) may be carried in the tracks associated with the sets of tiles. A track that includes a flag may be decoded and mapping information may be used to access the set of tiles associated with the spatial region that has been updated, e.g., while the tracks without a flag do not need to be decoded.

One or more patches may be associated with a set of tiles. In examples, the patch(es) may be mapped to the sets of tiles (e.g., the tile groups). As shown as an example in FIG. 11, Tile Group 0 may include patches P0, P1, P2, P3, and P4. Tile Group 1 may include patches P0 and P1. Tile Group 2 may include patches P0, P1, and P2; and Tile Group 3 may include patch P0. Tile Group 4 may include patches P1, P2, and P3. The patches may indicate orientations associated with an object represented by the spatial region(s).

Systems, devices, and methods are described herein for partial access support in International Organization for Standardization Base Media File Format (ISOBMFF) containers for video-based point cloud streams. File format structures may enable flexible, partial access to different parts of a coded point cloud sequence (e.g., encapsulated in an ISOBMFF container).

A video encoding device may partition a 3D space into a first spatial region and a second spatial region. The video encoding device may map the first spatial region to a first set of V-PCC tiles and the second spatial region to a second set of V-PCC tiles. Each of the first set of V-PCC tiles and the second set of V-PCC tiles may be associated with an atlas frame. Each of the first set of V-PCC tiles and the second set of V-PCC tiles may be independently decodable. Mapping each of the first spatial region to the first set of V-PCC tiles and the second spatial region to the second set of V-PCC tiles may be based on tile identifications and/or track identifications. The first set of V-PCC tiles may be associated with a first set of patches and the second set of V-PCC tiles may be associated with a second set of patches. The video encoding device may determine a first track to carry first mapping information associated with the first spatial region that is mapped to the first set of V-PCC tiles. The video encoding device may determine a second track to carry second mapping information associated with the second spatial region that is mapped to the second set of V-PCC tiles. The video encoding device may send in a timed-metadata V-PCC bitstream the first track and the second track. The first track and the second track may be sent in a media container file.

The video encoding device may determine an update dimensions flag. The update dimensions flag may indicate an update to one or more dimensions of the first spatial region or an update to one or more dimensions of the second spatial region. The video encoding device may send the update dimensions flag in the time-metadata V-PCC bitstream.

The first spatial region may be associated with a first object. The second spatial region may be associated with a second object. The video encoding device may determine one or more object flags indicating the first spatial region is associated with the first object and the second spatial region is associated with the second object. The video encoding device may send the object flag(s) in the timed-metadata V-PCC bitstream. The video encoding device may determine an object dependency flag indicating the first object associated with the first spatial region is dependent on the second object associated with the second spatial region and may send the object dependency flag in the timed-metadata V-PCC bitstream. The video encoding device may determine an update object flag indicating an update to the first object associated with the first spatial region or an update to the second object associated the second spatial region and may send the update object flag in the timed-metadata V-PCC bitstream.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

I claim:

1. A video encoding device comprising:
a processor configured to:
partition a three-dimensional (3D) space into a first spatial region and a second spatial region;
map the first spatial region to a first set of video point cloud coding (V-PCC) tiles and the second spatial region to a second set of V-PCC tiles, wherein the first set of V-PCC tiles is associated with a first track and the second set of V-PCC tiles is associated with a second track, and wherein the first spatial region is associated with a first object and the second spatial region is associated with a second object;
determine that the first track carries a first data associated with the first set of V-PCC tiles mapped to the first spatial region;
determine that the second track carries a second data associated with the second set of V-PCC tiles mapped to the second spatial region; and
send the first track, the second track, and a timed-metadata track associated with the first track and the second track, wherein the timed-metadata track comprises mapping information associated with the first spatial region mapped to the first set of V-PCC tiles and the second spatial region mapped to the second set of V-PCC tiles.

2. The video encoding device of claim 1, wherein the processor is further configured to:
determine an update dimensions flag indicating an update to one or more dimensions of the first spatial region or the second spatial region; and
send the update dimensions flag in the timed-metadata track.

3. The video encoding device of claim 1, wherein mapping each of the first spatial region to the first set of V-PCC tiles and the second spatial region to the second set of V-PCC tiles is based on a tile identifier or an atlas identifier.

4. The video encoding device of claim 1, wherein the processor is further configured to:
determine an object flag indicating whether 3D bounding boxing information for the first object or the second object is signaled; and
send the object flag in the timed-metadata track.

5. The video encoding device of claim 1, wherein the processor is further configured to:
determine an object dependency flag indicating the first object is dependent on the second object; and
send the object dependency flag in the timed-metadata track.

6. The video encoding device of claim 1, wherein the processor is further configured to:
determine an object flag indicating that the first spatial region or the second spatial region is associated with an object; and
send the object flag in the timed-metadata track.

7. The video encoding device of claim 1, wherein the first set of V-PCC tiles is associated with a first set of patches and the second set of V-PCC tiles is associated with a second set of patches.

8. The video encoding device of claim 1, wherein each of the first set of V-PCC tiles and the second set of V-PCC tiles is independently decodable.

9. The video encoding device of claim 1, wherein the first track, the second track, and the timed-metadata track are sent in a multi-track data container file.

10. A method, comprising:
partitioning a three-dimensional (3D) space into a first spatial region and a second spatial region;
mapping the first spatial region to a first set of video point cloud coding (V-PCC) tiles and the second spatial region to a second set of V-PCC tiles, wherein the first set of V-PCC tiles is associated with a first track and the second set of V-PCC tiles is associated with a second track, and wherein the first spatial region is associated with a first object and the second spatial region is associated with a second object;
determining that the first track carries a first data associated with the first set of V-PCC tiles mapped to the first spatial region;
determining that the second track carries a second data associated with the second set of V-PCC tiles mapped to the second spatial region; and
sending the first track, the second track, and a timed-metadata track associated with the first track and the second track, wherein the timed-metadata track comprises mapping information associated with the first spatial region mapped to the first set of V-PCC tiles and the second spatial region mapped to the second set of V-PCC tiles.

11. The method of claim 10, further comprising:
determining an update dimensions flag indicating an update to one or more dimensions of the first spatial region or the second spatial region; and
sending the update dimensions flag in the timed-metadata track.

12. The method of claim 10, wherein mapping each of the first spatial region to the first set of V-PCC tiles and the second spatial region to the second set of V-PCC tiles is based on a tile identifier or an atlas identifier.

13. The method of claim 10, further comprising:
determine an object flag indicating whether 3D bounding boxing information for the first object or the second object is signaled; and
send the object flag in the timed-metadata track.

14. The method of claim 10, further comprising:
determining an object dependency flag indicating the first object is dependent on the second object; and
sending the object dependency flag in the timed-metadata track.

15. A video decoding device comprising a processor configured to at least:
receive a video point cloud coding (V-PCC) data container file comprising a first atlas track, a second atlas track, and a timed metadata track;
receive a timed-metadata track associated with a first track and a second track, wherein the timed-metadata track comprises mapping information associated with a first set of V-PCC tiles mapped to a first spatial region and a second set of V-PCC tiles mapped to a second spatial region, wherein the first spatial region is associated with a first object and the second spatial region is associated with a second object;
receive the first track carrying a first data associated with the first set of V-PCC tiles mapped to the first spatial region and the second track carrying a second data associated with the second set of V-PCC tiles mapped to the second spatial region;
send a request for samples associated with the first set of V-PCC tiles mapped to the first spatial region; and
receive the requested samples associated with the first set of V-PCC tiles.

16. The video decoding device of claim 15, wherein the processor being configured to receive the mapping information further comprises the processor being configured to receive samples associated with the timed-metadata track carrying the mapping information.

17. The video decoding device of claim 15, wherein the mapping information comprises information about the first object associated with the first spatial region and the second object associated with the second spatial region.

18. The video decoding device of claim 15, wherein the processor being configured to send the request for the samples associated with the first set of V-PCC tiles comprises the processor being configured to send the request for samples associated with the first object associated with the first spatial region.

19. The video decoding device of claim 15, wherein the first set of V-PCC tiles are selected based on a viewport associated with a user.

* * * * *